United States Patent
Whillock et al.

(10) Patent No.: US 10,452,732 B2
(45) Date of Patent: Oct. 22, 2019

(54) DEVICE-KEYED FILTERING FOR DATA COOPERATIVE ACCESS

(71) Applicant: Adobe Inc., San Jose, CA (US)

(72) Inventors: Asa Whillock, San Francisco, CA (US); David Weinstein, Rockville Centre, NY (US)

(73) Assignee: Adobe Inc., San Jose, CA (US)

( * ) Notice: Subject to any disclaimer, the term of this patent is extended or adjusted under 35 U.S.C. 154(b) by 242 days.

(21) Appl. No.: 15/355,450

(22) Filed: Nov. 18, 2016

(65) Prior Publication Data

US 2018/0144050 A1 May 24, 2018

(51) Int. Cl.
*G06F 17/30* (2006.01)
*G06F 16/9535* (2019.01)
*H04L 29/06* (2006.01)

(52) U.S. Cl.
CPC ........ *G06F 16/9535* (2019.01); *H04L 63/104* (2013.01); *H04L 63/0236* (2013.01); *H04L 63/0876* (2013.01); *H04L 63/101* (2013.01); *H04L 63/105* (2013.01)

(58) Field of Classification Search
CPC ........... G06F 17/30867; G06F 16/9535; H04L 63/105; H04L 63/104
USPC ........................................................ 707/754
See application file for complete search history.

(56) References Cited

U.S. PATENT DOCUMENTS

| | | | | |
|---|---|---|---|---|
| 7,246,128 B2* | 7/2007 | Jordahl | ............. | G06F 16/24578 707/999.101 |
| 8,438,184 B1* | 5/2013 | Wang | ..................... | H04L 67/02 707/780 |
| 9,183,520 B2* | 11/2015 | Davis | ..................... | G06Q 10/06 |
| 10,116,536 B2* | 10/2018 | Palanciuc | ............... | H04L 43/08 |
| 2010/0306249 A1* | 12/2010 | Hill | ........................ | G06Q 30/02 707/769 |
| 2013/0124309 A1* | 5/2013 | Traasdahl | ............... | H04L 67/22 705/14.49 |
| 2016/0125471 A1* | 5/2016 | Hsu | .................... | G06Q 30/0269 705/14.66 |
| 2017/0141980 A1* | 5/2017 | Palanciuc | ............... | H04L 43/08 |

* cited by examiner

*Primary Examiner* — Shahid A Alam

(74) *Attorney, Agent, or Firm* — Kilpatrick Townsend & Stockton LLP

(57) ABSTRACT

The disclosure describes systems and methods of limiting access to data that is commonly held, such as by a data cooperative. Certain embodiments involve providing a filter system that receives a record with user device identifiers, and uses the received record to create or modify a filter that is associated with a participant system. The filter system creates a filter key based on a device identifier from the record and assigns the filter key to the associated filter. The filter is applied to a data source including one or more stored device identifiers, and a determination is made whether the stored device identifiers are linked to the filter key. In some embodiments, determining a link is based on characteristics of the stored device identifiers, or on user indications (e.g., "opt-out" preferences), or both. The linked device identifiers are provided to the participant system.

20 Claims, 12 Drawing Sheets

DEVICE-KEYED FILTERING FOR DATA COOPERATIVE ACCESS

TECHNICAL FIELD

This disclosure relates generally to the field of data cooperatives, or other organizations that aggregate and provide data, and more specifically relates to limiting access to data that is held by a data cooperative.

BACKGROUND

Data cooperatives are organizations that store data on behalf of participants in the cooperative and share the data with the participants. A data cooperative is often operated as a service to which a participant can subscribe. Data that is provided to the cooperative can be specific to a particular field of data aggregation, such as data related to advertisement campaigns or data related to online transactions. Data cooperatives (or "cooperatives") include many unique participants, such as organizations that share their own data assets with the cooperative in exchange for having access to the data held in common by the cooperative. A participant may join a data cooperative in order to increase the participant's knowledge about its customer base, or to increase its knowledge about potential customers. In return, the data cooperative may receive some or all of the participant's collected data assets. Data that is received from the participants may be held in a common data store that may be accessed by all participants.

In general, it is advantageous for a data cooperative to have many participants, to increase the size of the common data store. However, allowing unlimited access by different participants to the cooperative's data holdings may raise concerns regarding security and user privacy. A large, well-established data cooperative may be of sufficient size to provide data that is of interest for the current participants. However, the large size of the common data store may encourage small or new organizations to join, which may increase concerns about security. For example, a small or new organization may be unprepared for, or indifferent to, the security measures required to keep large amounts of user data safe. Furthermore, users who have some information stored in a data cooperative may object to having their information universally available to all participants of the cooperative, regardless of the size or reputation of the participants.

In addition, organizations with very extensive data assets may be reluctant to join a smaller cooperative. In some cases, the organization may have concerns related to maintaining the privacy of its customer base in regards to other participants in the cooperative. Additionally or alternatively, the cooperative's common data may be small relative to the organization's own data assets, and the organization may believe that adding its data assets to the cooperative's common store would provide a relatively greater advantage to the other participants, possibly competitors, while providing the organization with a relatively smaller advantage. Thus, it is desirable for a data cooperative to protect user privacy while promoting participation.

Current solutions for protecting user privacy and promoting participation are inadequate to address the drawbacks indicated. A technique that is sometimes employed by a participant is to withhold certain data assets from the data cooperative, such as withholding all data assets related to mobile devices. However, this technique does not safeguard the privacy of users whose information is related to the data assets that are not withheld. In addition, this technique encourages the participant to benefit from common data while preventing other participants from benefiting from the withheld data assets, and may limit the growth of the cooperative. For example, other participants, or potential participants, may view this practice as unfair, and may choose not to participate in the cooperative.

Alternatively, a solution that is frequently attempted by data cooperatives is to limit a participant's access to a certain quantity of the common data, where the quantity of common data is related to the amount of data provided by the participant. However, such attempted solutions do not adequately address concerns of either privacy or fairness. As an example, a data cooperative may provide a participant with access to twice as much data as it provides, such as allowing access to 400,000 common data records based on a contribution of 200,000 records. However, this attempted solution does not protect user privacy. For example, a user's information may be provided to a participant that the user finds objectionable. In addition, the received data may not include information relevant to the participant's business. These attempted solutions do not differentiate between participants that do or do not have existing relationships with individual users. Furthermore, even if the cooperative wishes to provide additional data to the participant, as a means of providing value, other participants may perceive the action as unfair, and choose not to participate.

Thus, existing solutions for controlling access to data cooperatives may present disadvantages such as (but not limited to) those described above.

SUMMARY

According to certain embodiments, a filter system, such as a filter system in a data cooperative, limits access of participant systems to data. In some cases, a participant system represents a participant in a data cooperative, and the data is common data that is held by the data cooperative to which the participant belongs. In some embodiments, the filter system receives a record of user data from the participant system, where the record represents information related to the user. For example, the record could represent an authenticated user identification and one or more device identifiers. The device identifiers could be associated, in the record, to the user identification, such as if the user logged in to an account using a particular computing device.

In additional or alternative embodiments, the filter system uses the received record to create or to modify a filter that is associated with the participant system. For example, the filter system could use each device identifier from the record to create a filter key. A given filter key could be based on a given device identifier. In some cases, the filter key is dissociated from the other information contained in the record. For instance, this dissociation includes not associating the filter key with the user identification.

In some embodiments, each created filter key is assigned to a filter that is associated with the participant system, and the filter is applied to a data source, such as a data store that is commonly held by the data cooperative. In some cases, the data source includes data clusters (or "device clusters," or "clusters"), such that each data cluster includes one or more device identifiers. Within a particular data cluster, each device identifier could be associated to each other device identifier in that cluster. In some embodiments, matching data clusters are identified based on the applied filter, such that an identified matching cluster includes at least one stored device identifier that corresponds to a filter key assigned to the applied filter. In some cases, it is determined that one or more of the stored device identifiers are linked to the filter key. In some further embodiments, the linked device identifiers are provided to the participant system.

These illustrative embodiments are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
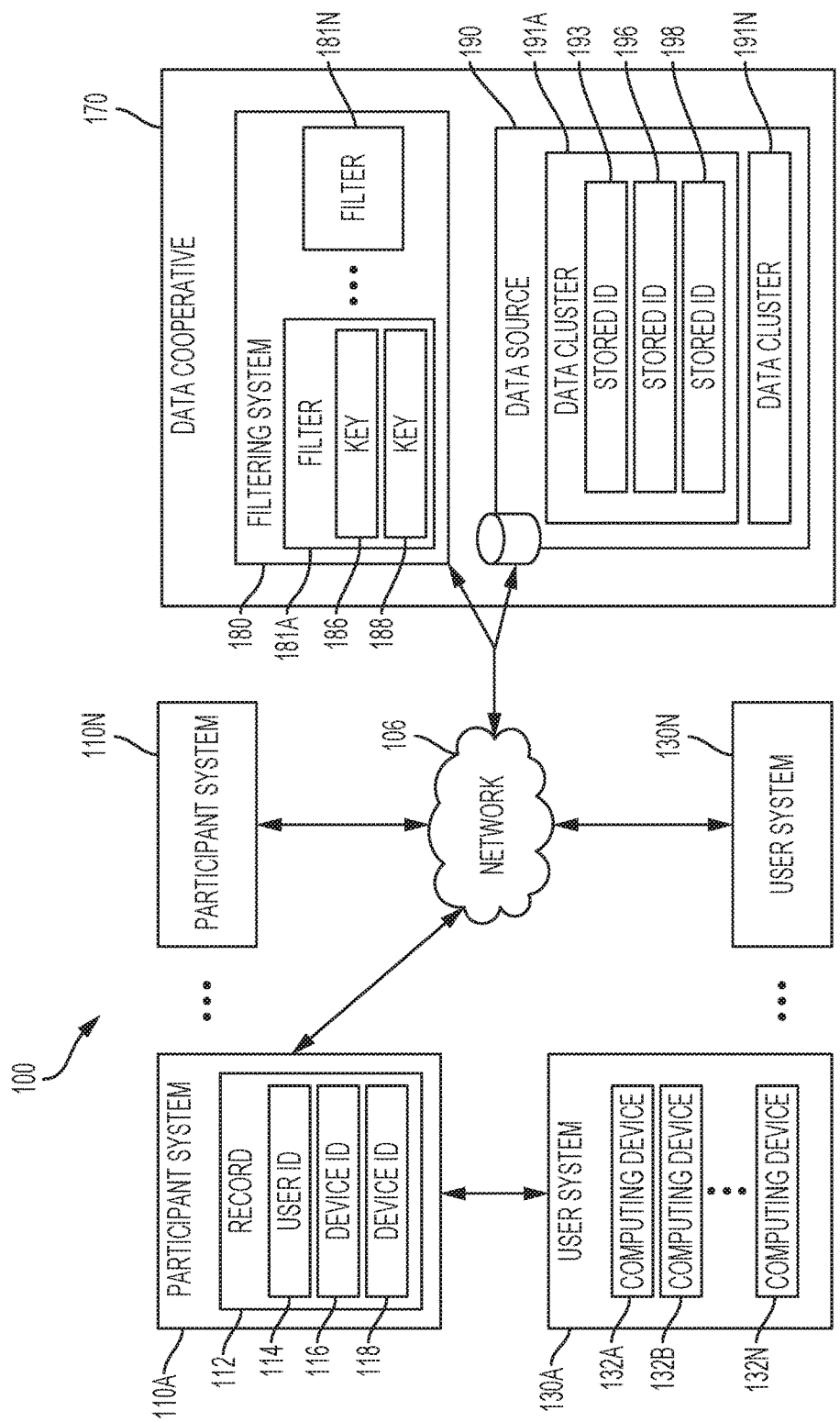
FIG. 1 is a block diagram depicting an example of a filtering system for limiting access to commonly held data, according to certain embodiments.

As discussed above, prior techniques for limiting access to commonly held data in a data cooperative do not adequately protect user privacy or promote participation in the cooperative, while allowing participants access to data that is useful to their organizational interests. Certain embodiments described herein provide techniques for limiting a participant's access to data held by a data cooperative, while still providing data that is relevant to the interests of the participant. For example, a filtering system limits a participant's access to commonly held data (e.g., device identifiers) so that the participant accesses data that is related to data assets provided by the participant.

In an exemplary embodiment, a participant provides services to a user (e.g., provides travel agency services). The user has previously provided information to the participant, such as authentication information (also referred to as a "user ID") and at least one computing device identifier (also referred to as a "computing device ID," "user device identifier," or "user device ID"). The participant provides some of this information to a filtering system. Identifying information, such as the user ID, is removed. The filtering system creates a filter for the participant, with filter keys based on the provided computing device IDs. Data that is shared with the participant from the cooperative is based on the filter.

The filtering system is associated with a data cooperative, which has commonly held data including data clusters. Each data cluster includes stored device identifiers (or "stored device IDs," or "stored IDs"), which represent a group of associated devices. For example, the stored IDs represent computing devices that have been associated with a same user (e.g., by various user authentications provided to other participants). In some cases, the cluster includes an indication that the stored IDs are associated, but does not include information about the user.

The filtering system applies the filter to the data stored by the cooperative. Filter keys in the filter are compared to stored device IDs. If a filter key matches a stored device ID, a link is determined between the matching stored ID and other stored IDs included in the same cluster. The filtering system provides the linked stored IDs to the participant, while withholding commonly held data that does not match the filter. The information provided to the participant is limited to stored device IDs that are associated with the user that has already received services from the participant. In some embodiments, as described below, the filter may limit information based on other indications, such as user preferences regarding data sharing.

The following examples are provided to introduce certain embodiments of the present disclosure. In some embodiments, a user receives services from a participant. For example, the user accesses a website run by the participant, and logs in to the website on a laptop using a user account. The participant stores the login information as a user ID (e.g., the user's login name that is authenticated by a password), and stores an identifier of the laptop as a computing device ID. For example, the authenticated login name could represent the user ID, and the internet protocol (IP) address of the laptop could represent the computing device ID. The user ID could be associated with the computing device ID based on the user's act of authenticating the login name while using the laptop. If the user subsequently logs in to the website from a different device (e.g., a smartphone), a different computing device ID could also be associated with the user ID. The participant stores such information, such as in a data record. In this example, the data record includes the user ID, the computing device IDs for the laptop and the smartphone, and an association between each of these.

In certain further embodiments, a filtering system is executed on a suitable computing system with appropriate access to a data store of a data cooperative. The filtering system receives, from a participant system, a data record having information such as a user ID and at least one computing device ID. The filtering system uses the received record to create or modify a filter that is associated with the participant system. For example, the filter system could determine each device identifier included in the record. For each determined device identifier, the filter system creates a filter key. In some cases, a created filter key is based on only the computing device ID from the record. For example, the filter key is not associated with the user ID. Additionally or alternatively, a created filter key is based on additional information from the received record. Non-limiting examples of additional information include a computing device characteristic associated with the computing device ID (e.g., an operating system, a mobile device model), a geographical region associated with the computing device ID, the user ID or an encrypted copy of the user ID, or an association between the computing device ID and other computing device IDs from the record. In some embodiments, each created filter key is assigned to a filter that is associated with the participant system. The filter could be pre-existing, such as if the participant has previously provided records with device identifiers, or the filter could be generated for the participant based on the created filter keys.

In additional or alternative embodiments, the filter is applied to a data source, such as a database or other data store. The data source includes data clusters. In some cases, each of the clusters includes one or more additional stored device IDs. Within a particular data cluster, each stored device ID is associated with each other stored device ID in that cluster. In certain further embodiments, each cluster also includes additional information that is associated with the stored device identifiers (e.g., a device type, a geographical region).

In some embodiments, the filter system identifies one or more matching data clusters based on the applied filter, such that each identified matching cluster includes at least one stored device identifier corresponding to at least one filter key assigned to the applied filter. In additional or alternative embodiments, the stored device IDs in the matching clusters are linked based on computing device IDs that were included in the provided records, limiting the participant's data access to stored device IDs (in the matching clusters) that are linked to computing device IDs already known to the participant (in the provided data records).

Additionally or alternatively, the filter system identifies the matching data clusters further based on additional information included in the filter and in the data source's clusters. For example, a created filter key could be based on additional information, such as a computing device characteristic associated with the computing device ID in the record. The clusters in the data source could include device characteristics associated with the stored device IDs. In this example, the filter identifies matching clusters that include a stored device ID, with associated characteristics, that corresponds to a computing device ID and characteristics indicated by a filter key. In such cases, the stored device IDs are linked based on computing device IDs and characteristics that were included in the provided records, limiting the participant's data access to stored device IDs that are both linked to previously known computing device IDs and share characteristics with the previously known computing device IDs. As an alternative example, a filter applied to a data source with additional information about geographic regions could limit a participant's access to stored device IDs associated with countries where that participant is authorized to conduct operations.

In additional or alternative embodiments, the filter system provides to the participant system the stored device identifiers included in the matching data clusters. In certain embodiments, the filter system withholds from the participant system data that is not included in the matching data clusters, or additional information from the matching clusters that is not the stored device identifiers, or both.

As used herein, the terms "data cooperative" and "cooperative" mean organizations that hold data on behalf of participants in the cooperative, and can share the data with participants. Data cooperatives can include many unique participants, including organizations that share their own data assets with the cooperative in exchange for having access to the data held in common by the cooperative. In return, the data cooperative may receive some or all of the participant's collected data assets. Data that is received from the participants may be held in a common data store that may be accessed by all participants.

As used herein, the term "participant" means an organization that is a member of a data cooperative. In some cases, "participant" may refer to a prospective participant that is considering joining a data cooperative. A participant may be an organization or company that collects and uses data in their typical business transactions. In some cases, a participant gathers or uses data related to a user or group of users. Examples of participants include, but are not limited to, companies, organizations, online community groups, or any combination of these participants. A participant may offer a product or service, such as to a user. In some cases, a participant offers products or services without receiving compensation. A participant may join a data cooperative in order to increase the participant's knowledge about its user base, or to increase its knowledge about potential users.

As used herein, the term "user" means an entity that has a relationship with one or more participants. In some cases, a user may be an individual person, or a formal or informal group such as a company or organization. A user may generate data that is provided to or stored by a participant or a data cooperative. Examples of users include, but are not limited to, companies, organizations, online community groups, end users, administrators, or any combination of these users. Examples of a user's relationship to a participant include, but are not limited to, a customer, an account holder, a member of a community, or a non-paying recipient of services.

As used herein, the term "user identification" means a digital identity that is associated with a user. A user identity can be authenticated by any suitable authentication method or device, such as, but not limited to, username-password combinations, biometric information, encrypted or non-encrypted key tokens, identification information embedded in a device (e.g., radio-frequency identification ("RFID") badge), or any combination of identifying information.

As used herein, the terms "data" and "data assets" mean information that is provided to, gathered by, or stored by a participant or a data cooperative. Data may be associated with a user, such as data generated when a user provides identity authentication information to a website. Data may be specific to a particular field, such as data related to advertisement campaigns or data related to online transactions. In some cases, data, or any portion of a data asset, is encrypted by any suitable means.

As used herein, the term "link" means a determined association between two or more pieces of data. In some cases, a link between data is created when each piece of data meets criteria, such as criteria of a filter. In some cases, data may be "unlinked" by a dissociation between two or more pieces of data. For example, updated filter criteria could unlink data that had been previously linked. In some embodiments, a link is indicated by a software flag, a data storage structure, or any other suitable indication.

As used herein, the term "characteristic" means data related to a descriptive attribute. For example, a user (or a user identity) can have user characteristics, such as (without limitation) demographic information, browsing history, timespent metrics, payment information, or user account preferences. Additionally or alternatively, a computing device can have device characteristics such as (without limitation) operating system, type of computing device, list of installed software, or use patterns. Additionally or alternatively, a participant can have participant characteristics such as (without limitation) a geographical location, a type of business (e.g., travel agency), an organization status (e.g., non-profit), or a preferred language of operations.

It is desirable to protect user privacy while allowing participants access to data that is useful to their organizational interests. It is also desirable to develop solutions to allow users to place limitations on how information related to their online activities is used. Certain embodiments described herein provide techniques for limiting a participant's access to data in a data cooperative, while still providing data that is relevant to the interests of the participant.

It is also desirable to develop solutions to incentivize participants to join and provide data to the cooperative, while fairly limiting a participant's access to data commonly held. For example, organizations with very extensive data assets may be reluctant to join a smaller cooperative, because the cooperative's common data may be small relative to the organization's own data assets. The size of the cooperative's data holdings, and the relative size of each participant's holdings, can create a perception of unfairness for some participants. In some cases, certain described embodiments encourage participation in a data cooperation while allowing access to data in a manner that fair and useful to all participants in the cooperative.

Referring now to the drawings, FIG. 1 is a diagram of an exemplary environment 100 in which one or more embodiments of the present disclosure can be practiced. The environment 100 includes one or more participant systems, such as a participant system 110A up to a participant system 110N. Each of the participant systems is connected to a filtering system 180 via a network 106. Examples of the network 106 include, but are not limited to, internet, local area network ("LAN"), wireless area network, wired area network, wide area network, and the like.

In some embodiments, the environment 100 includes one or more user systems, such as a user system 130A through a user system 130N. Each of the user systems is connected to the filtering system 180 via the network 106. In some embodiments, one or more of the user systems, such as user system 130A, is connected to the filtering system via a participant system, such as participant system 110N, and the participant system's network connection to the filtering system.

The participant systems 110A-110N correspond to various participants in a data cooperative, such as data cooperative 170. In embodiments, a participant provides a product or service, such as to a user. One non-limiting example of a provided product or service could be providing to a user access to an online travel booking service. Examples of participants include, but are not limited to, companies, organizations, online community groups, any combination of these participants, or any other entity that might gather or use data related to a group of users.

The user systems 130A-130N correspond to various users having data stored with either the data cooperative 170 or any participant system 110A-110N. Examples of the users include, but are not limited to, companies, organizations, online community groups, end users, administrators, any combination of these users, or any other user who generates data that may be stored with a participant or with a data cooperative. Although FIG. 1 does not depict direct connections for clarity, it is understood that each of the participants and users may exchange products or services.

In embodiments, a particular user system includes one or more computing devices. For example, the user system 130A includes computing devices 132A through 132N. The user of the user system provides an identity authentication to one or more of the included computing devices. Examples of an authentication include, but are not limited to, username-password combinations, biometric information, key tokens, identification information embedded in a device (e.g., RFID badge), any combination of identifying information, or any other information that may reasonably authenticate the personal identity of the user. Examples of computing devices included in the user system include, but are not limited to, a personal computer, a laptop computer, a tablet computer, a mobile digital device (e.g., smartphone, personal digital assistant), a wearable/implantable device (e.g., exercise measurement wristband, medical treatment patch), a gaming or entertainment device, a content access device (e.g., television set-top box, video access device, music streaming device, electronic book reader), vehicles or building access devices capable of monitoring occupants, or any other computing device that may receive information related to an authenticated identity.

The filtering system 180 is connected to a data store 190. In some embodiments, the filtering system 180 and the data store 190 are included as part of a data cooperative 170. In other embodiments, a data cooperative includes data store 190, and filtering system 180 is provided by a third party. The data store 190 can be implemented as one or more databases, one or more data servers, or as any other suitable data storage system. Although the filtering system 180 and data store 190 are depicted as having a direct connection, other embodiments are possible, such as connections through a network (e.g., network 106).

In embodiments, the filtering system 180 maintains a collection of one or more filters, such as filters 181A through 181N. In certain embodiments, each participant system is associated at least one filter, or each filter is associated with at least one participant, or both. Additionally or alternatively, each participant system is associated with a unique filter, or each filter is associated with a unique participant, or both. For example, participant system 110A is associated with filter 181A.

In an exemplary embodiment, a user of the user system 130A accesses a product or service provided by the participant having the participant system 110A. For example, the user accesses, with a first computing device 132A, a website associated with the participant, and provides a username-password combination to authenticate the user's identity to the website. Information associated with the user's access of the website is provided to the participant, such as at participant system 110A. In some embodiments, the information provided to the participant includes the authenticated identity associated with the username-password combination and a network address associated with the first computing device 132A. The information could be organized using any suitable storage structure, such as data record 112 that includes the authenticated identity as a user identification 114 and the network address of the first computing device 132A as a computing device identifier 116. In certain embodiments, the information provided to the participant can include additional information, such as (without limitation) user characteristics (e.g., demographic information, payment information, user account preferences), device characteristics (e.g., operating system, type of computing device, list of installed software), or usage characteristics (e.g., use patterns, browsing history, timespent metrics). In certain embodiments, some, all, or none of the information stored with the participant is encrypted.

In an additional or alternative embodiment, a user of the user system 130A accesses, with a second computing device 132B, a product or service provided by the same participant with participant system 110A. For example, the user accesses, with the second computing device 132B, an application (or "app") associated with the participant, and provides a username-password combination to authenticate the user's identity to the app. Information associated with the user's access of the app is provided to the participant, such as at participant system 110A. The information could be organized suitably, such as with the data record 112 that includes the authenticated identity as the user identification 114, and the network address of the second computing device 132B as a second computing device identifier 118. In some embodiments, the first and second identification device identifiers 116 and 118 are associated within the data record 112, such as by being associated with each other, or with the user identification 114, or both. In some cases, the data record 112 includes additional computing device identifiers (not shown), such as an identifier for any computing device 132A through 132N that is used by the user to authenticate his or her identity to the participant.

In an additional or alternative embodiment, the filtering system 180 receives information, such as the data record 112, from the participant system 110A. In certain cases, some, all, or none of the information is encrypted before or after being received. The filtering system could use the received information to create or to modify a filter associated with the participant system, such as a filter 181A that is associated with participant system 110A. For example, the filtering system 180 could create respective filter keys 186 and 188 for the filter 181A based on respective computing device IDs 116 and 118. In some cases, more than one filter key is created for a particular computing device ID. In some embodiments, a filter key is based on information that is dissociated from other information received by the filtering system, such as filter key 186 based on computing device ID 116 that is dissociated from the additional computing device ID 118 and the user ID 114. In additional or alternative embodiments, a filter key is based on multiple associated pieces of information, such as filter key 188 based on computing device ID 118 and an associated device characteristic. In some cases, filter keys are assigned to a filter associated with the participant system that provided the received information, such as assigning filter keys 186 and 188 to filter 181A. In some embodiments, a filter may indicate additional characteristics of the associated participant, such as, without limitation, a business status (e.g., non-profit) or a category (e.g., geographical location).

In certain embodiments, the filtering system 180 applies a filter to a data source, such as by applying filter 181A to data store 190. The data source can include information that is held in common by the data cooperative, such as data received from participants. For example, data store 190 could include one or more data clusters, such as data clusters 191A through 191N. Each data cluster could include related information that is associated in a group. For example, a data cluster 191A could include one or more stored device identifiers, such that each device ID stored in the cluster is associated with each other device ID stored in the cluster. Additionally or alternatively, the data cluster 191A could include additional information associated with one or more stored device identifiers, such as a stored device ID that is associated with a characteristic (e.g., a type of computing device, a user demographic quality).

In additional or alternative embodiments, applying the filter includes determining that a filter key assigned to the filter corresponds to a piece of information in the data source. For example, the filter key 186 could correspond to a stored device identifier 196 that is included in the data store 190, and applying the filter 181A determines that the stored device ID 196 corresponds to the filter key 186.

In some embodiments, based on the applied filter, the filtering system identifies a matching data cluster that includes the information corresponding to a filter key assigned to the applied filter. For example, the filtering system 180 could identify the matching data cluster 191A based on the applied filter 181A, such that the matching data cluster 191A includes the stored device ID 196 corresponding to the filter key 186.

In additional or alternative embodiments, based on the applied filter, the filtering system determines that additional information in the matching data cluster is linked to the information corresponding to the filter key. For example, the filtering system 180 could determine that an additional stored device ID 193 is linked to the stored device ID 196 that corresponds to the filter key 186. In some cases, determining that stored device IDs 196 and 193 are linked is based on the inclusion of both in matching data cluster 191A. Additionally or alternatively, determining that stored device IDs 196 and 193 are linked is based on an association between them, such as an association between each of the device IDs 193, 196, and 198 stored in the matching data cluster 191A.

In additional or alternative embodiments, the filtering system determines a link based on other information in the matching data cluster. For example, if the filter key 188 indicates a computing device ID 118 and an associated characteristic (e.g., a type of computing device), and the matching data cluster 191A includes a characteristic associated with a stored device ID 198, the filtering system 180 could determine that stored device IDs 198 and 193 are linked based on the stored device IDs 198 and 193 having a stored characteristic corresponding to the characteristic indicated by the filter key 188. Additionally or alternatively, the filtering system could determine a link based on stored device IDs having a stored characteristic corresponding to a characteristic that is associated with the participant system (e.g., a geographic location where the participant is permitted to conduct business). For example, the filtering system 180 could determine that stored device IDs 198 and 193 are linked based on each having a stored characteristic corresponding to a characteristic of the participant, as indicated by the filter 181A.

In some embodiments, the filtering system provides to the participant system some or all of the information included in the identified matching data cluster. Additionally or alternatively, the filtering system provides an indication that the provided information is linked together. For example, if a data cluster 191A including stored device IDs 193, 186, and 198 is identified as a matching data cluster based on the applied filter 181A, the stored device IDs and an indication that the stored IDs are linked together could be provided to the participant system 110A. In certain embodiments, filtering system 180 provides to the participant system 110A all of the information included in the matching data cluster 191A. Additionally or alternatively, the participant system 110A receives a portion, or none, of the information included in the matching data cluster 191A. For example, the filtering system 180 could limit the provided information based on additional criteria, such as a characteristic indicated by one of more of the filter keys 186 and 188, or a characteristic that is associated with the participant system 110A.

In certain embodiments, filtering system 180 receives a request for information associated with the data cooperative 170. Additionally or alternatively, the filtering system 180 provides the requested information in response to receiving the request. For example, the filtering system 180 receives from participant system 110A a request for information regarding the filter 181A, or for stored information available through applied filter 181A, or both. Additionally or alternatively, the filtering system 180 receives from user system 130A a request for stored information associated with user system 130A. Responsive to a received request, the filtering system 180 provides some, all, or none of the requested information to the requesting system. For example, information could be provided to participant system 110A via a user interface (not depicted) that is associated with the participant system 110A.

Device Graph

Figure 2:
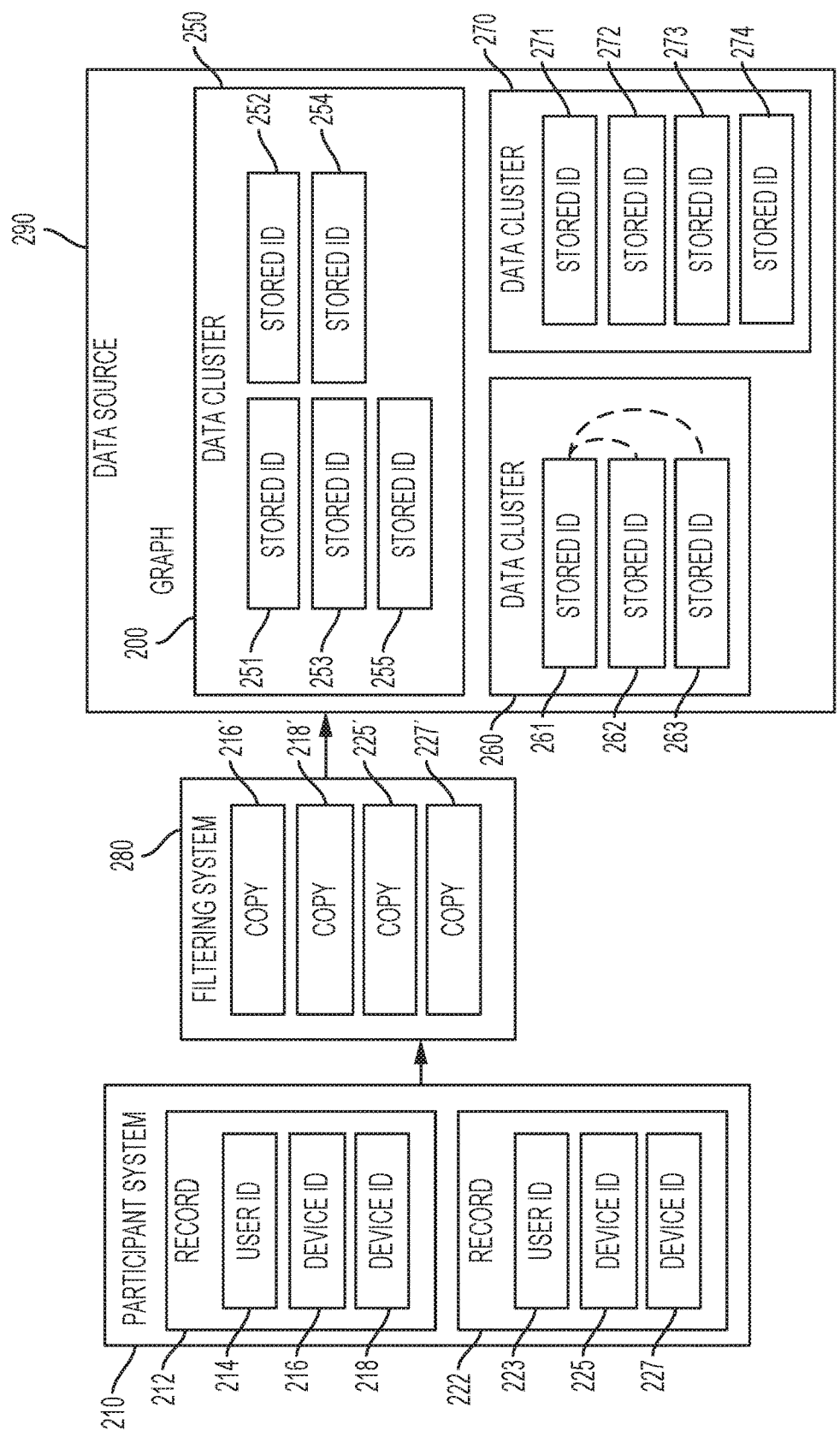
FIG. 2 is a diagram depicting an example of a system capable of modifying a device graph, according to certain embodiments.
Figure 3:
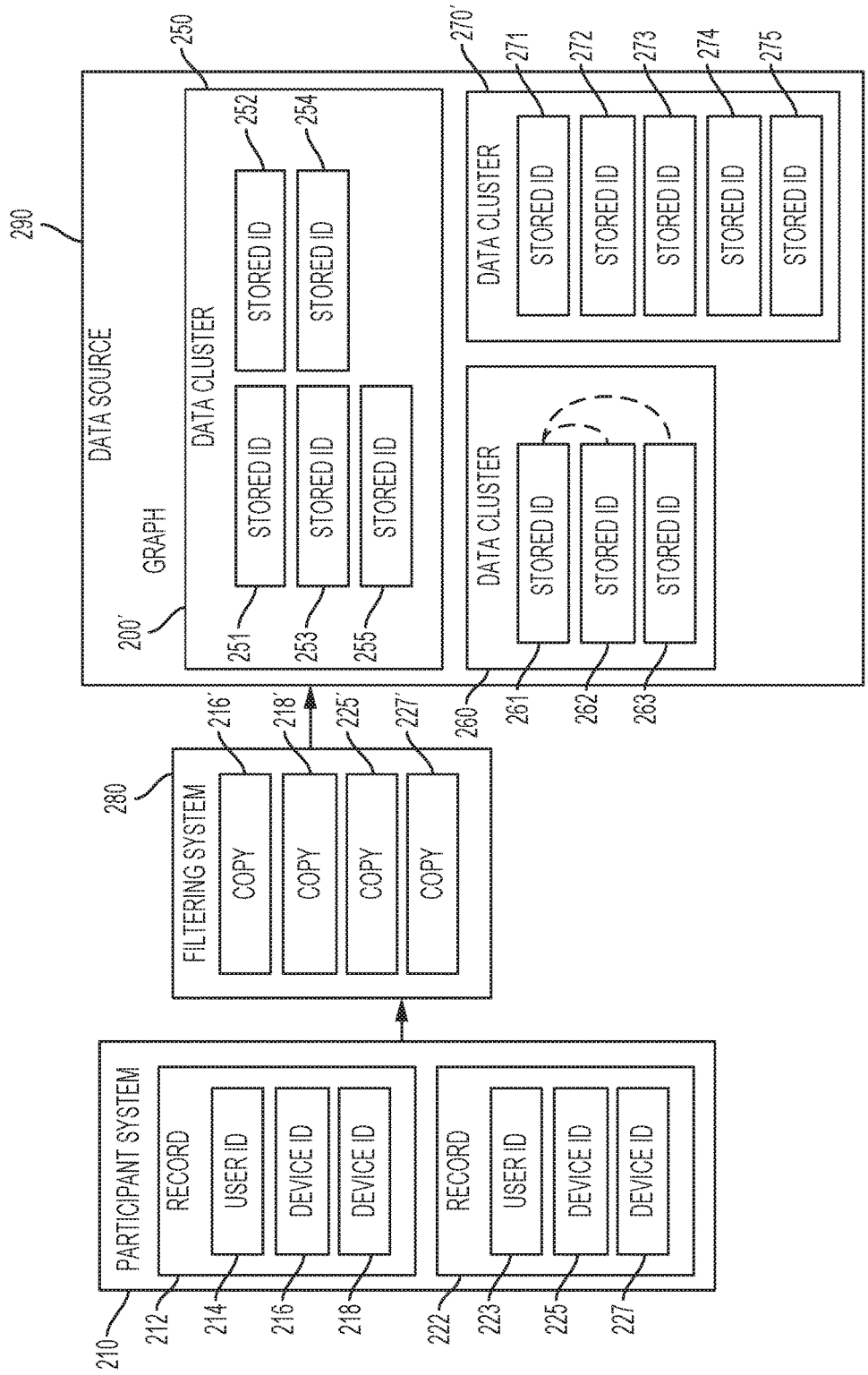
FIG. 3 is a diagram depicting an example of a system capable of modifying a device graph, according to certain embodiments.
Figure 4:
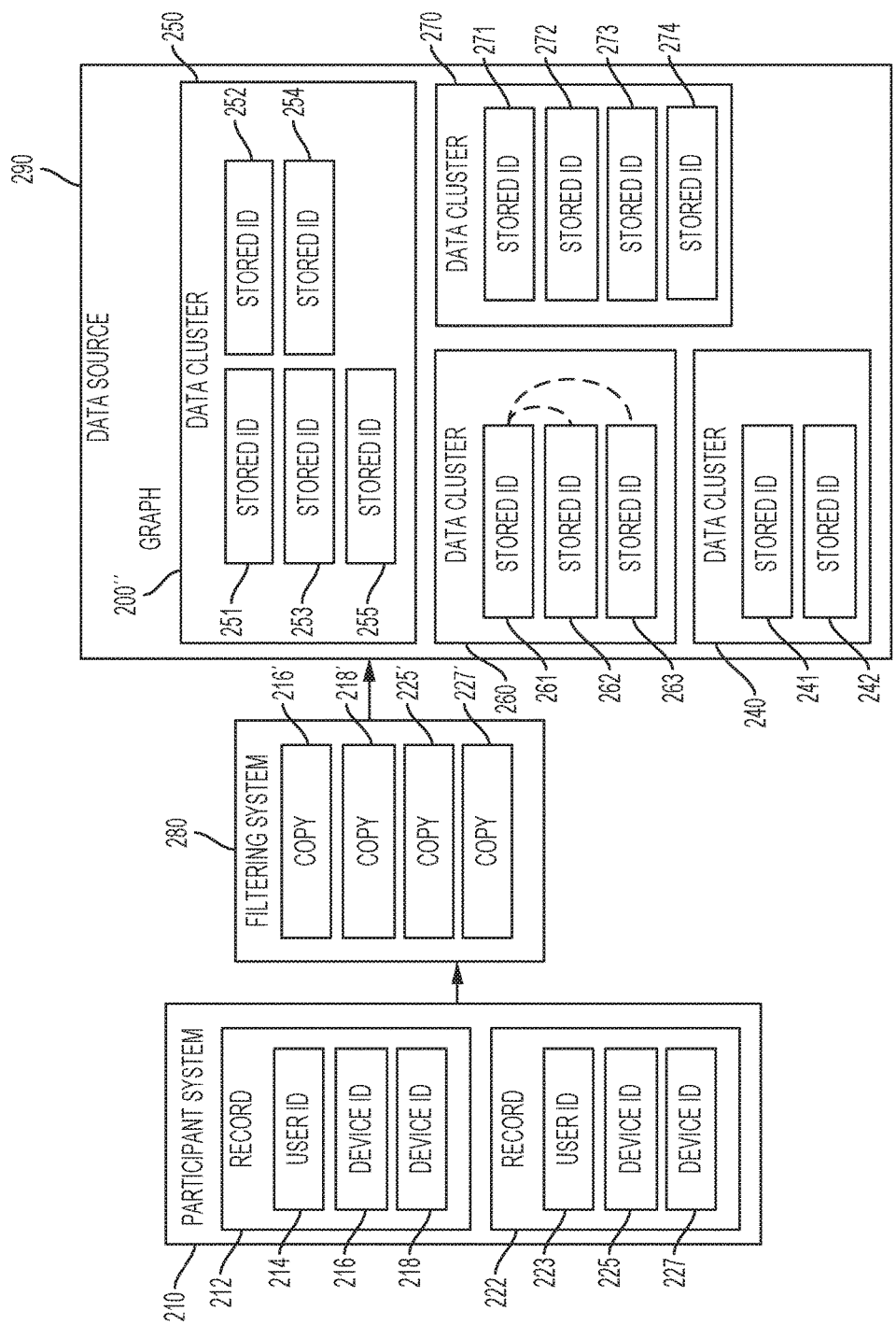
FIG. 4 is a diagram depicting an example of a system capable of modifying a device graph, according to certain embodiments.

In some embodiments, a data cooperative, such as data cooperative 170, stores information that is held in common by the data cooperative, such as data received from participants. In additional or alternative embodiments, the stored information is organized as a graph in which pieces of stored information are associated with other pieces of stored information. FIGS. 2-4 are diagrams of exemplary systems in which graphs store information associated within data clusters. A graph could be stored by a data source, such as data store 290. In FIG. 2, graph 200 includes data clusters 250, 260, and 270. Each of the data clusters 250, 260, and 270 includes various pieces of information that are associated together within the cluster.

As described in regards to FIG. 1, the stored information could include stored device identifiers, and certain stored device IDs could be associated with other stored device IDs within a data cluster. For example, stored device identifiers 251 through 255, 261 through 263, and 271 through 274 could be organized in graph 200, in respective data clusters 250, 260, and 270. Within the data cluster 250, each of the stored device identifiers 251, 252, 253, 254, and 255 are associated with each other. Within the data cluster 260, each of the stored device identifiers 261, 262, and 263 are associated with each other. Within the data cluster 270, each of the stored device identifiers 271, 272, 273, and 274 are associated with each other. In graph 200, an association between the pieces of stored information may be called a vertex. For example, stored device ID 261 has an association (or vertex) with each of stored device IDs 262 and 263. For clarity, FIG. 2 does not show the vertices between every piece of stored information.

In additional or alternative embodiments, a data cluster includes additional information, such as stored characteristics. In some cases, the stored characteristics are associated with other stored information. For example, various stored device IDs within data cluster 250 could include a device type characteristic. Stored device IDs 251 and 253 could include a device type of smartphones, while stored device IDs 252 and 254 could indicate a laptop computer device type. In some cases, a characteristic may be unknown, such as stored device ID 255 indicating an unknown device type.

In additional or alternative embodiments, a device graph may be modified, such as by adding new information, removing information, or reorganizing how the information is associated. For example, graph 200 could receive new information, such as from a participant. A filtering system, such as filtering system 280, receives information from a participant, such as through participant system 210. The received information could be data record 212 and data record 222. The filtering system could receive the data record in a process as described in regards to FIG. 1, or in a separate process, or both. Data record 212 could include the user identification 214, and the associated computing device identifiers 216 and 218. Data record 222 could include the user identification 223, and the associated computing device identifiers 225 and 227.

In an exemplary embodiment, the filtering system receives information included in data records 212 and 222 from participant system 210. The filtering system creates a copy of some, all, or none of the received information. For example, the filtering system could create copies 216', 218', 225', and 227' of respective computing device ID 216, 218, 225, and 227, but not create copies of user identifiers 214 and 223. In some cases, the copies that are related to a same data record are associated together. For example, the filtering system 280 could provide, to the data store 290, the copies 216' and 218' with an indication that they are associated together, and also the copies 223' and 225' with an indication that they are associated together. In some cases, the copies are compared to the stored information already present in the graph 200. Based on the comparison, it can be determined whether the graph 200 should be modified. In regards to FIG. 2, filtering system 280 is depicted as comparing the copies to the stored information and determining whether the graph should be modified; however, other embodiments are envisioned.

Additionally or alternatively, a type of graph modification can be determined based on the received information. FIGS. 3 and 4 are diagrams of exemplary systems in which information is stored in exemplary modified graphs. For example, filtering system 280 compares copies 216' and 218' to the stored device IDs in each of the clusters 250, 260, and 270. Based on this comparison, filtering system 280 determines that copy 216' corresponds (e.g., has a similar value) to the stored device ID 271, and determines based on the correspondence that the graph is to be modified. In FIG. 3, modified graph 200' includes a modified device cluster 270', which includes a new stored device ID 275. The stored device ID 275 corresponds to the computing device ID indicated by copy 218' and is associated with modified cluster 270' based on the association of copies 218' and 216'.

Additionally or alternatively, filtering system 280 compares copies 225' and 227' to the stored device IDs in each of the clusters 250, 260, and 270. Based on this comparison, filtering system 280 determines that the copies 225' and 227' are different from each stored device ID, and determines based on the difference that the graph is to be modified. In FIG. 4, modified graph 200" includes new device cluster 240, which includes new stored device IDs 241 and 242. The stored device ID 241 corresponds to the computing device ID indicated by copy 225', and the stored device ID 242 corresponds to the computing device ID indicated by copy 227'. Within the device cluster 240, the stored device IDs 241 and 242 are associated together based on the association of copies 225' and 227'.

In certain embodiments, the graph is modified by a system that does not perform other processes (e.g., does not modify or apply a filter). In additional or alternative embodiments, the filtering system 280 could modify the graph in a process similar to that described in regards to FIG. 1. For example, the filtering system 280 could receive a data record 212, and create or modify a filter based on the information in record 212. Based on application of the filter, the filtering system 280 could identify a matching data cluster, such as data cluster 270, that includes a stored device ID 271 corresponding to a filter key based on computing device ID 216. Additionally or alternatively to solutions similar to those described regarding FIG. 1, the filtering system 280 can determine that matching data cluster 270 does not include a stored device ID corresponding to computing device ID 218. Based on this determination, the filtering system 280 provide a copy 218', such that a new stored device ID corresponding to the computing device ID 218 is added to the matching data cluster. Additionally or alternatively, the filtering system 280 could modify the graph in a process that is separate from the processes of creating, modifying, or applying a filter.

Application of Filters

Figure 5:
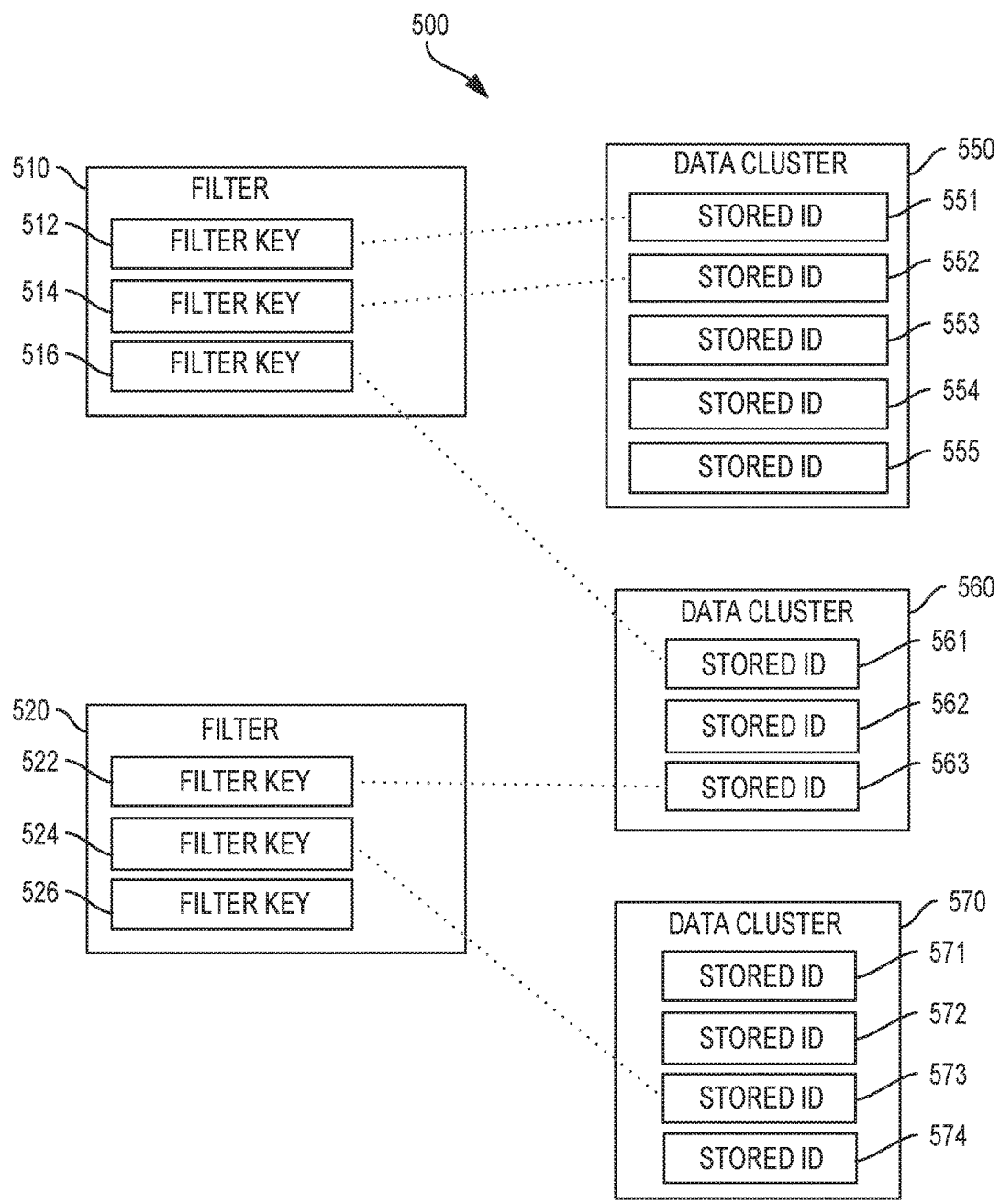
FIG. 5 is a diagram depicting an example of a system in which various filters are used to limit access to commonly held data, according to certain embodiments.

FIG. 5 is a diagram indicating an exemplary system 500 in which various exemplary filters are used to limit access to commonly held data. The system 500 includes filters, such as filters 510 and 520 that are maintained by a filtering system, and data clusters, such as data clusters 550, 560, and 570 that are included in a data source.

In some embodiments, each of the filters 510 and 520 is associated with a respective participant system. Additionally or alternatively, each of the filters 510 and 520 has one or more filter keys assigned to it. For example, filter 510 has assigned filter keys 512, 514, and 516, and filter 520 has filter keys 522, 524, and 526. In some cases, as described above, the filters could include additional information indicating a characteristic associated with a filter key, such as a device type, or additional information indicating a characteristic of the participant, such as a geographical location. Additionally or alternatively, the filters could include filter keys that are dissociated from other information, such as filter keys that omit user identification information, as described above.

Additionally or alternatively, each of the data clusters 550 and 560 includes one or more stored device identifiers. For example, data cluster 550 has stored device IDs 551, 552, 553, 554, and 555 stored, data cluster 560 has device IDs 561, 562, and 563 stored, and data cluster 570 has device IDs 571, 572, 573, and 574 stored. In some cases, as described above, the data clusters 550, 560, and 570 could include additional information indicating a characteristic that is associated with a stored device ID characteristic, such as a device type.

In additional or alternative embodiments, a filter is applied to a data source, similar to as described in regards to FIG. 1. For example, the filter 510 could be applied, such as by a filtering system, to the data source including data clusters 550, 560, and 570. Based on applying the filter 510, it could be determined that the filter key 512 corresponds to the stored device ID 551, that filter key 514 corresponds to the stored device ID 552, and that filter key 516 corresponds to the stored device ID 561. Based on this determination, data clusters 550 and 560 may each be identified as a matching data cluster, where each matching data cluster includes a stored device ID that corresponds to a filter key in the applied filter 510.

In some embodiments, based on the applied filter, it is determined that one or more additional stored device IDs included in the matching data cluster are linked to the stored device ID corresponding to the filter key. For example, it could be determined that matching data cluster 550 has stored device IDs 553, 554, and 555 that are linked to stored device IDs 552 and 551, such that the determination is based on applied filter 510, and/or the correspondence of filter keys 512 and 514 to stored device IDs 551 and 552. It could also be determined that matching data cluster 560 has stored device IDs 562 and 563 that are linked to stored device ID 561 such that the determination is based on applied filter 510, and/or the correspondence of filter key 516 to stored device ID 561.

In additional or alternative embodiments, linked stored device identifiers are provided to a participant system associated with an applied filter, with an indication that the stored device IDs are linked. For example, based on the applied filter 510, a participant system associated with filter 510 is provided with stored device IDs 553, 554, and 555, with an indication that the three are linked to IDs 551 and 552, and also provided with stored device IDs 562 and 563, with an indication that the two are linked to stored device ID 561. In some cases, the participant system does not receive information that is not linked, such as stored device IDs 571, 572, 573, and 574.

In some embodiments, determining that a link exists between stored device IDs is dependent on additional information in an applied filter. For example, the filter 520 could have additional information regarding a device type, such that filter keys 522 and 524 could each indicate a device type of a personal computer. Additionally or alternatively, data clusters 560 and 570 could include information indicating that stored device IDs 561, 571, and 572 are each associated with a device type of a smartphone, and that stored device IDs 563, 573, and 574 are each associated with a device type of a personal computer. Based on applying filter 520 to the data source including data clusters 550, 560, and 570, it could be determined that the filter key 522 corresponds to the stored device ID 563, and that filter key 524 corresponds to the stored device ID 573. Data clusters 560 and 570 may each be identified as a matching data cluster based on this determination.

In additional or alternative embodiments, determining that additional stored device IDs are linked to the stored device ID corresponding to the filter key is based on a characteristic indicated by the applied filter. For example, it could be determined that stored device ID 562 has a personal computer device type, and that this stored characteristic corresponds to the characteristic indicated by filter key 522. It could be further determined that stored device ID 562 is linked to stored device ID 563, such that the determination is based on the corresponding characteristic of a personal computer device type. Additionally or alternatively, it could be determined that stored device ID 574 has a personal computer device type, and that this stored characteristic corresponds to the characteristic indicated by filter key 524. It could be further determined that stored device ID 574 is linked to stored device ID 573, based on the corresponding characteristic of a personal computer device type.

Additionally or alternatively, based on the applied filter 520, a participant system associated with filter 520 is provided with stored device ID 562, with an indication that it is linked to stored device ID 563, and also provided with stored device ID 574, with an indication that it is linked to stored device ID 573. In some cases, the participant system does not receive information that is not linked, such as stored device IDs 561, 571, 572, 551, 552, 553, 554, and 555.

In some embodiments, a filter or a filter key may have a setting indicating a permission level. For example, a permissive filter setting may allow a stored device ID with an unknown characteristic to be linked to the filter key, while a restrictive filter setting may allow the stored device ID with an unknown characteristic to be omitted from the filter key. In some cases, the filter or filter key setting may be dependent upon a characteristic of the participant associated with the filter (e.g., a reputation characteristic). Additionally or alternatively, the filter or filter key setting may be dependent upon an indication received from a user, as described elsewhere herein.

Opt-Out Solutions

Figure 6:
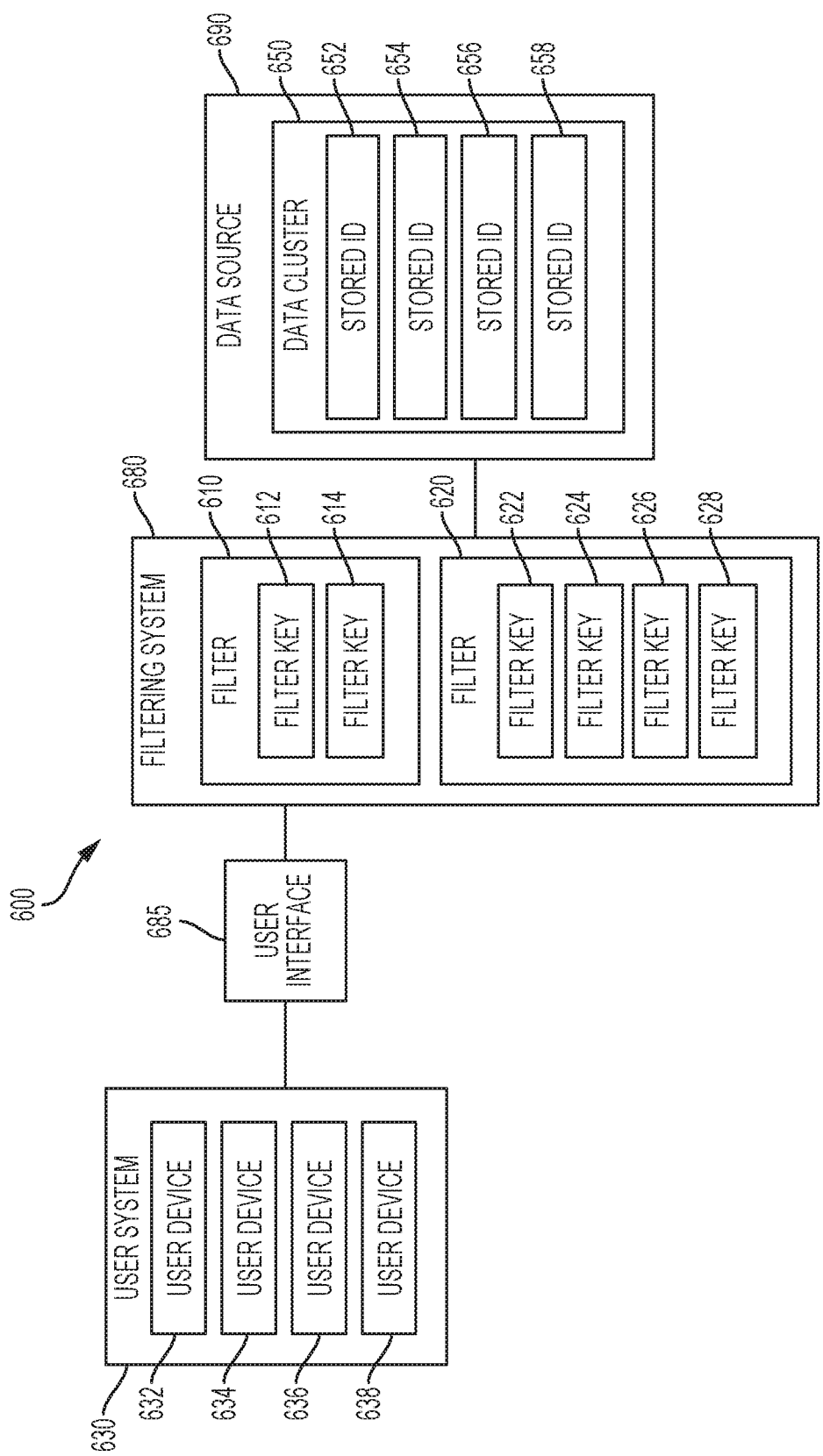
FIG. 6 is a diagram depicting an example of a system in which a user can indicate limitations regarding information generated by the user, according to certain embodiments.

FIG. 6 is a diagram indicating an exemplary system 600 in which a user can indicate limitations regarding information generated by the user. The system 600 includes a filtering system, such as filtering system 680, with maintained filters, and data clusters that are included in a data source, such as data store 690. A user, such as a user associated with user system 630, could interact with the filtering system 680 to place limitations on how the user's data is used. In some embodiments, interactions between the user and the filtering system 680 are performed via user interface 685.

In some embodiments, the filtering system 680 maintains the filters 610 and 620. Filters 610 and 620 could each be associated with respective participant systems (not shown) for a first participant and a second participant. Filter 610 could include filter keys 612 and 614. Filter 620 could include filter keys 622, 624, 626, and 628.

In some embodiments, the user system 630 includes user devices 632, 634, 636, and 638. For illustration, and not by way of limitation, the user device 632 is a computing device for the user's workplace, and user device 634 is a computing device that is shared by the user's family, including young children. The user accesses a product or service of the first and second participants using one or more of the user devices 632, 634, 636, and 638.

In some embodiments, the data store 690 includes data cluster 650. The data cluster 650 includes stored device IDs 652, 654, 656, and 658. For illustrative purposes, user devices 632, 634, 636, and 638 each have a computing device ID that corresponds to respective stored device IDs 652, 654, 656, and 658. For example, the first or second participants could provide to the filtering system data records that include information related to the user devices, as described elsewhere herein.

The user may desire to place limitations on how information related to user system 630 is used. In some embodiments, the user accesses filtering system 680 via user interface 685. The user could interact with the user interface via user system 630, as depicted in FIG. 6, but other implementations are possible. For example, the user could interact with user interface 685 via a participant system.

In some embodiments, the filtering system 680 receives a request, via the user interface 685, to provide information related to user system 630. Responsive to the request, the filtering system 680 determines related information. In some cases, the filtering system determines the related information based on a computing system that connects to the user interface. For example, if the user interacts with the user interface 685 via user device 632, the filtering system 680 could determine the related information based on an identification of user device 632. Additionally or alternatively, the filtering system 680 determines the related information based on an indication received via user interface 685, such as a computing device selection received from the user.

In additional or alternative embodiments, the filtering system 680 determines the related information based in part on the maintained filters. For example, responsive to a request to provide information related to user system 630, the filtering system 680 determines that filter keys 612 and 622 are based on the identifier for computing device 632, filter keys 614 and 624 are based on the identifier for computing device 634, filter key 626 is based on the identifier for computing device 636, and filter key 628 is based on the identifier for computing device 638. In some embodiments, the user interface 685 displays some or all of the related information. For example, the user interface could display an indication for each one of the filter keys 612, 614, 622, 624, 626, and 628, or it could display an indication that the filtering system 680 has information related to the user devices 632, 634, 636, and 638.

For illustration, the user could choose to place limitations regarding the workplace user device 632. In some embodiments, the user provides, via the user interface 685, an indication that information related to user device 632 is to be limited. For example, the user could indicate that participants should not receive information related to user device 632. The filtering system 680 receives the indication via user interface 685. In some cases, the received indication includes a computing device identifier associated with user device 632. Based on the received indication, the filtering system 680 determines whether the indicated computing device identifier corresponds to one or more filter keys, or to a device identifier stored in a data cluster, or to both. For example, the filtering system 680 could determine that the received indication corresponds to filter key 612 and filter key 622, and/or to stored device ID 652 in data cluster 650.

In additional or alternative embodiments, the filtering system 680 limits the use of information related to the computing device identifier included in the indication. For example, based on the determination that the received indication corresponds to filter keys 612 and 622, filtering system 680 could modify one or more filters to prevent associated participants from accessing information related to the indicated computing device identifier. In some cases, the filtering system 680 removes the filter keys 612 and 622 from respective filters 610 and 620. Additionally or alternatively, filtering system 680 could modify filters 610 and 620 to indicate that if either filter is applied as described elsewhere herein, no information related to the filter keys 612 and 622 is provided to the participant systems associated with each respective filter. Additionally or alternatively, filtering system 680 could provide to data store 690 the received indication, such that data store 690 removes stored device ID 652 or otherwise modifies data cluster 650 to withhold related information from a participant.

For illustration, the user could choose to place limitations regarding the shared family user device 634. In some embodiments, the user provides, via the user interface 685, an indication that participants with specific characteristics (e.g., companies that sell tobacco products) should not receive information related to user device 634. In some cases, the filtering system 680 receives an indication including a computing device identifier associated with user device 634, and an indication of one or more participant characteristics. Based on the received indication, the filtering system 680 determines whether the indicated computing device identifier corresponds to filter keys or to a stored device identifier, as described above. For example, the filtering system 680 could determine that the received indication corresponds to filter keys 614 and 624 and/or to stored device ID 654. Additionally or alternatively, the filtering system determines whether the indicated participant characteristics correspond to characteristics that are associated with a participant system. For example, the filtering system

680 could determine that filter 620 includes characteristics for the associated participant, which correspond to the indicated characteristics.

In additional or alternative embodiments, based on the determination that the received indication corresponds to characteristics included in filter 620, filtering system 680 could modify filter 620 to prevent the associated participant from accessing information related to the indicated computing device identifier. In some cases, as described above, the filtering system 680 removes the filter key 624, or modifies filter 620 to indicate that no information related to the filter key 624 is provided to the associated participant system. Additionally or alternatively, filtering system 680 could provide to data store 690 the received indication, such that data store 690 removes stored device ID 652 or otherwise modifies data cluster 650 to withhold related information from the associated participant.

Figure 7:
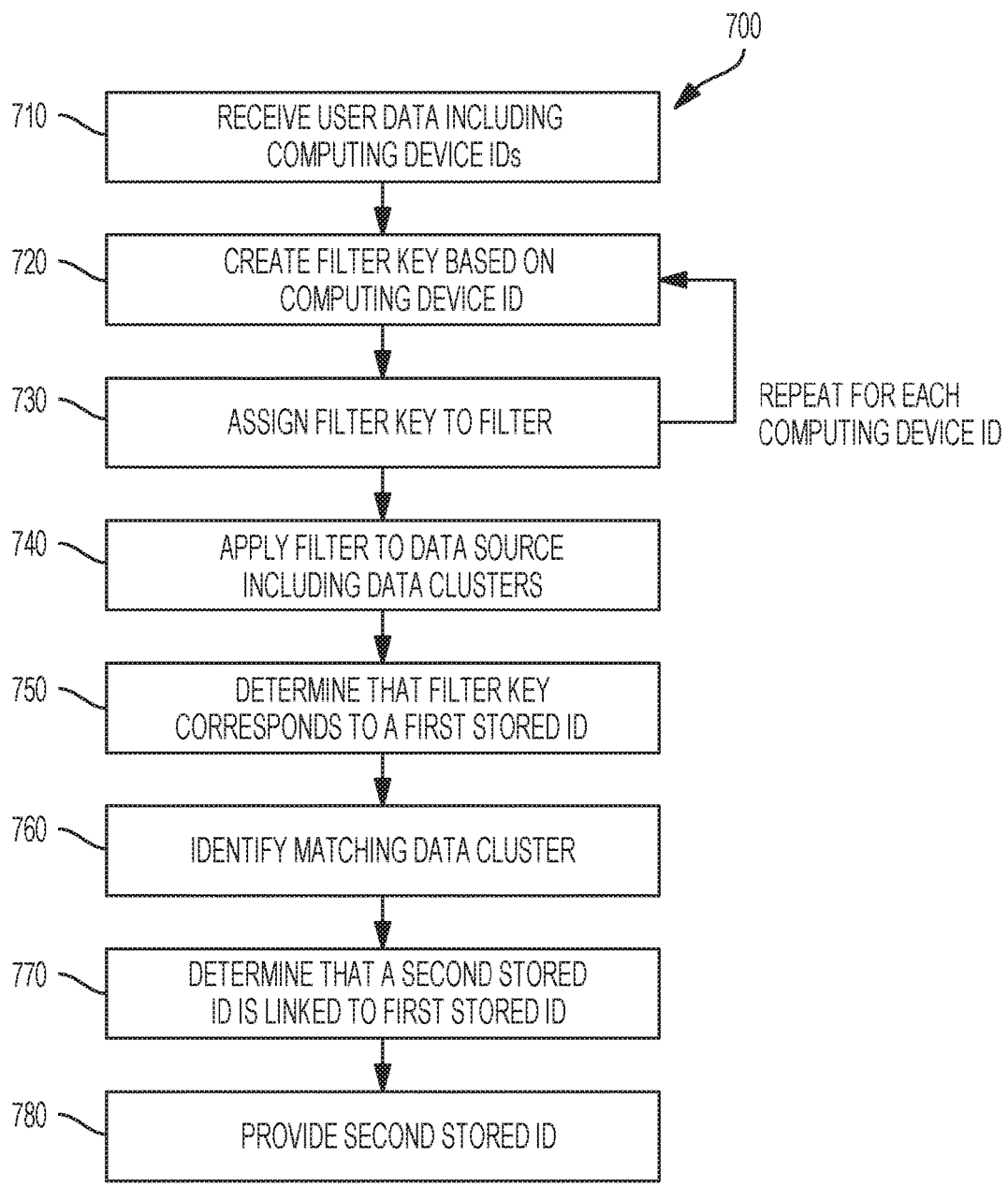
FIG. 7 is a flow chart depicting an example of a process for limiting access to data in a data cooperative, according to certain embodiments.

FIG. 7 is a flow chart depicting an example of a process 700 for limiting access to data in a data cooperative. In some embodiments, such as described in regards to FIGS. 1-6, a computing device executing a filtering system implements operations described in FIG. 7, by executing suitable program code. For illustrative purposes, the process 700 is described with reference to the examples depicted in FIGS. 1-6. Other implementations, however, are possible.

At block 710, the process 700 involves receiving user data including one or more computing device identifiers. The user data could be received from a participant system. For example, the user data could be received as part of a data record, as described in regards to FIGS. 1-6. In some cases, as described elsewhere herein, the received data further includes a user identification, additional information regarding the user or computing devices, additional information regarding the participant, or any combination of these.

At block 720, the process 700 involves creating a filter key based on a computing device ID. The created filter key could indicate additional information regarding the user, computing device, or participant, as described elsewhere herein.

At block 730, the process 700 involves assigning the created filter key to a filter. The filter could be associated with the participant system. The filter could indicate additional information regarding the user, computing device, or participant, as described elsewhere herein.

In some embodiments, operations related to either or both of blocks 720 and 730 are repeated for each computing device identifier included in the received user data.

At block 740, the process 700 involves applying the filter to a data source that includes data clusters. The clusters in the data source could have one or more stored device identifiers, as described in regards to FIGS. 1-6. In some cases, as described elsewhere herein, the data clusters further include additional information regarding the stored device identifiers, the participant, or any combination of these.

At block 750, the process 700 involves determining that a filter key assigned to the applied filter corresponds to a first stored device identifier included in a data cluster. For example, the filter key could correspond to a device ID stored in a data store, as described in regards to FIGS. 1-6.

At block 760, the process 700 involves identifying a matching data cluster, based on the applied filter. In some embodiments, the cluster that includes the first stored device ID is identified as the matching data cluster, as described in regards to FIGS. 1-6.

At block 770, the process 700 involves determining that a second stored device ID is linked to the first stored device ID, based on the applied filter. In some embodiments, the determination that the first and second stored IDs are linked is based on the matching data cluster including the first and second stored IDs. Additionally or alternatively, the determination is based on the second stored device ID having a stored characteristic that corresponds to a characteristic associated with the filter key or filter, as described elsewhere herein.

At block 780, the process 700 involves providing the second stored device ID. For example, the second stored ID could be provided to the participant system from which the user data was received, regarding block 710. In some embodiments, the second stored device ID is provided with an indication that it is linked to the first stored device ID, as described in regards to FIGS. 1-6.

Figure 8:
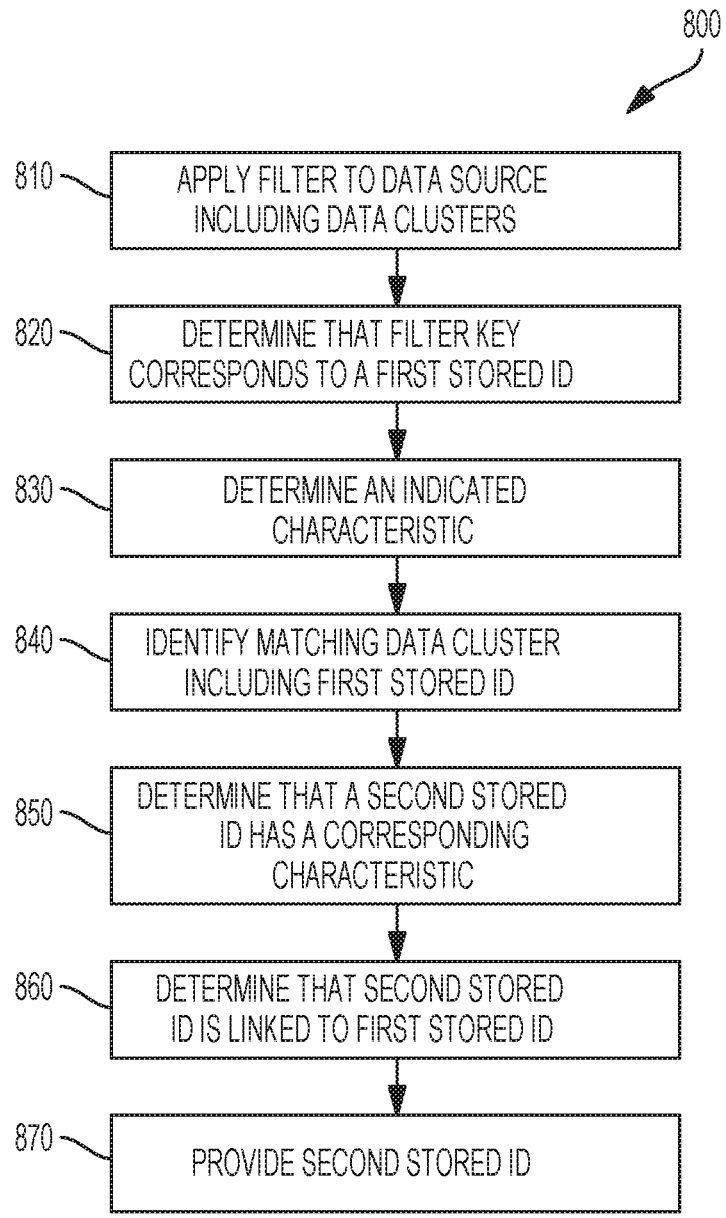
FIG. 8 is a flow chart depicting an example of a process for applying a filter to data in a data cooperative, according to certain embodiments.

FIG. 8 is a flow chart depicting an example of a process 800 for applying a filter to data in a data cooperative. In some embodiments, such as described in regards to FIGS. 1-7, a computing device executing a filtering system implements operations described in FIG. 8, by executing suitable program code. For illustrative purposes, the process 800 is described with reference to the examples depicted in FIGS. 1-7. Other implementations, however, are possible.

At block 810, the process 800 involves applying a filter to a data source that includes data clusters. The clusters in the data source could have one or more stored device identifiers, as described in regards to FIGS. 1-7. The filter could have one or more filter keys, as described elsewhere herein. In some cases, the filter, the filter keys, or both are maintained by a filtering system. The filter could be associated with a participant or a participant system, or both, as described elsewhere herein.

At block 820, the process 800 involves determining that a filter key included in the applied filter corresponds to a first stored device ID. The first stored ID could be included in a data cluster of the data source, as described elsewhere herein.

At block 830, the process 800 involves determining an indicated characteristic. In some embodiments, the characteristic is indicated by the filter key. For example, the filter key could indicate a characteristic, such as a smartphone device type, as described elsewhere herein. Additionally or alternatively, the applied filter could indicate a characteristic, such as a geographical region for a participant. In some embodiments, operations related to block 830 are omitted.

At block 840, the process 800 involves identifying that the data cluster that includes the first stored ID is a matching data cluster. In some embodiments, identifying the matching data cluster is based on the correspondence between the filter key and the first stored device ID. Additionally or alternatively, identifying the matching data cluster is based on other information, such as an indicated characteristic as described in regards to block 830.

At block 850, the process 800 involves determining that a second device ID stored in the matching data cluster has a corresponding stored characteristic. In some cases, the stored characteristic is determined to correspond to the indicated characteristic, described in regards to block 830. For example, the stored characteristic could indicate a same device type as the filter key's indicated characteristic, as described elsewhere herein. Additionally or alternatively, the stored characteristic could indicate a same geographical region as the filter's indicated characteristic, as described elsewhere herein. In some cases, the stored characteristic is related to the second stored ID, additional stored IDs, the data cluster, or any combination of these. In some embodiments, operations related to block 850 are omitted.

At block 860, process 800 involves determining that the second stored device ID is linked to the first stored device ID. In some embodiments, the link is determined based on the inclusion of the first and second stored IDs in the matching data cluster. Additionally or alternatively, the link is determined based on additional information, such as an indicated or stored characteristic. For example, the link could be determined based on the filter key and the second stored ID having a same device type characteristic, as described elsewhere herein.

At block 870, process 800 involves providing the linked stored device IDs. For example, the linked storage devices could be provided to a participant system associated with the applied filter, as described in regards to FIGS. 1-7. In some embodiments, the linked stored IDs are provided with an indication that they are linked. In some cases, information that is not linked is withheld from the recipient of the linked storage device IDs.

Figure 9:
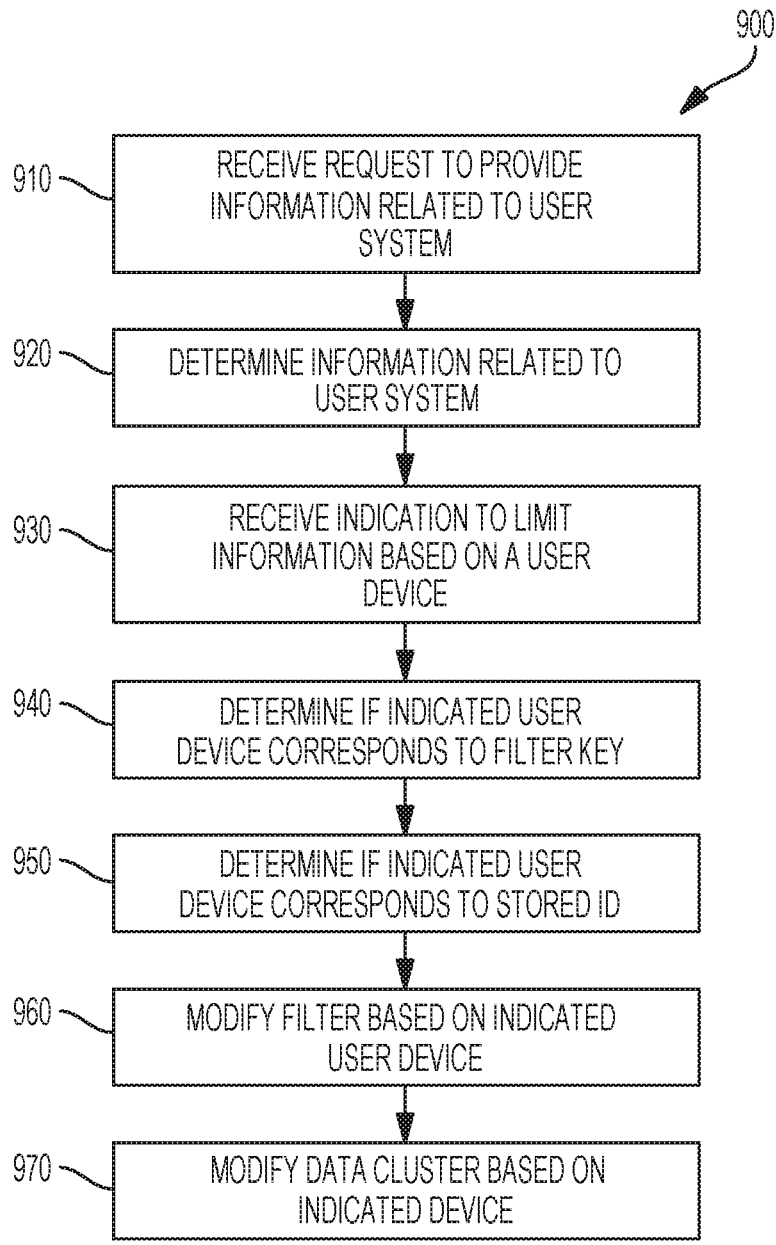
FIG. 9 is a flow chart depicting an example of a process for limiting access to data based on a received indication of a device identifier, according to certain embodiments.

FIG. 9 is a flow chart depicting an example of a process 900 for limiting access to data based on a received indication of a device identifier. In some cases, the indication is received from a user. In some embodiments, such as described in regards to FIGS. 1-8, a computing device executing a filtering system implements operations described in FIG. 9, by executing suitable program code. In additional or alternative embodiments, a computing device implementing a data source implements operations described in FIG. 9, by executing suitable program code. For illustrative purposes, the process 900 is described with reference to the examples depicted in FIGS. 1-8. Other implementations, however, are possible.

At block 910, process 900 involves receiving a request to provide information. For example, the requested information could be related to a user system including individual user computing devices. The request could be received via a user interface, or via a participant system, as described elsewhere herein.

At block 920, the process 900 determines the information that is related to the user system. For example, the information could be determined based on a computing device that provided the request, as described elsewhere herein. In some embodiments, the related information is determined in part on a filter maintained by a filtering system, as described in regards to FIGS. 1-8.

At block 930, the process 900 involves receiving an indication to limit access to information generated by the user system. In some cases, the limitation is based on an indicated user device included in the user system. For example, the limitation could be based on a computing device identifier, as described elsewhere herein.

At block 940, the process 900 involves determining if the indicated user device corresponds to a filter key. The filter key could be included in a filter maintained by a filtering system, as described elsewhere herein. At block 950, the process 900 involves determining if the indicated user device corresponds to a stored device identifier. The stored ID could be included in a data cluster in a data source, as described elsewhere herein.

In some embodiments, operations related to blocks 940 and 950 are performed. In additional or alternative embodiments, operations related to either of blocks 940 and 950 are omitted.

In block 960, the process 900 involves modifying a filter based on the indicated user device. For example, if the user device corresponds to a filter key, as determined by operations related to block 940, the filter associated with the filter key could be modified. In some embodiments, the filter is modified to limit access to information related to the indicated user device, as described elsewhere herein.

In block 970, the process 900 involves modifying a data cluster based on the indicated user device. For example, if the user device corresponds to a stored device ID, as determined by operations related to block 950, the data cluster associated with the stored ID could be modified. In some embodiments, the data cluster is modified to limit access to information related to the indicated user device, as described elsewhere herein.

In some embodiments, operations related to blocks 960 and 970 are performed. In additional or alternative embodiments, operations related to either of blocks 960 and 970 are omitted. In some cases, operations related to either of blocks 960 and 970 are performed or omitted responsive to previous operations. For example, if operations related to block 940 determine that the indicated user device corresponds to a filter key, the associated filter could be modified by operations related to block 960.

In some cases, operations described in relation to FIG. 9 could be performed by a data source. Additionally or alternatively, these operations could be performed by a filtering system, or responsive to operations performed by a filtering system, or both.

Figure 10:
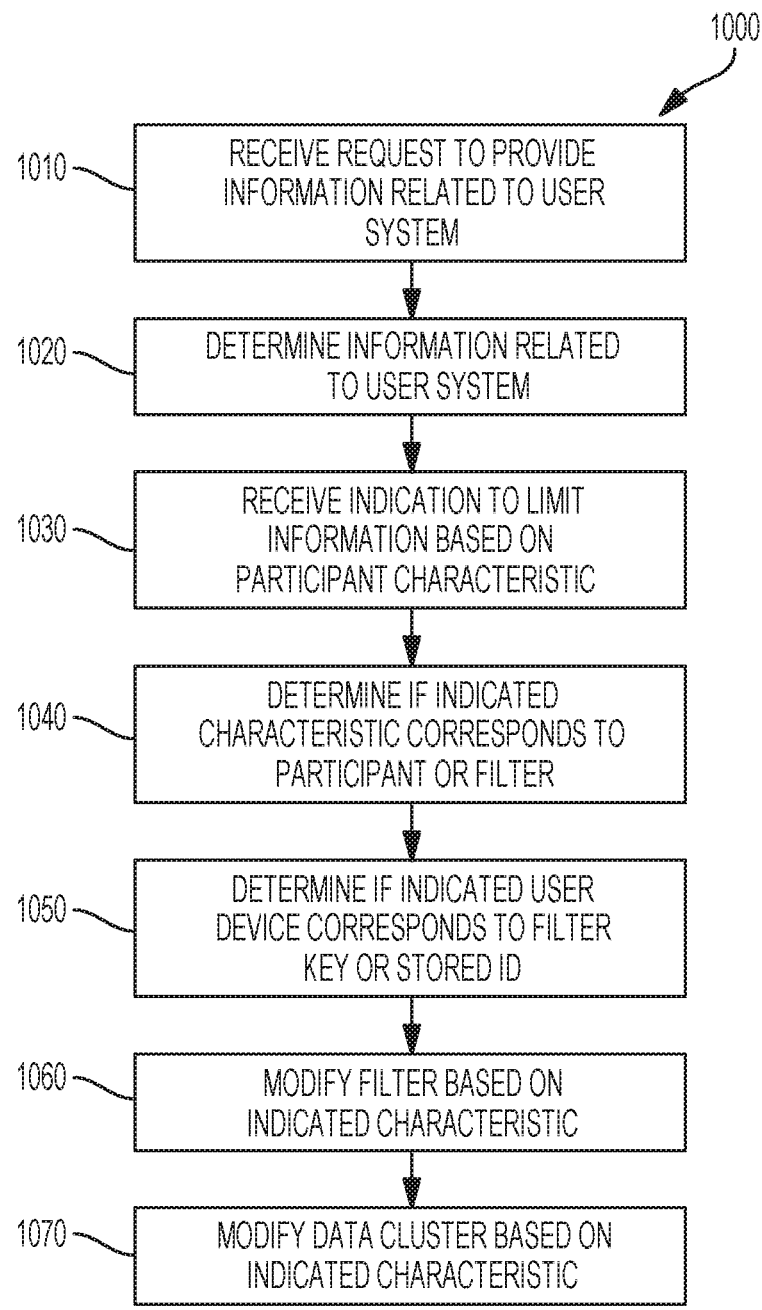
FIG. 10 is a flow chart depicting an example of a process for limiting access to data based on a received indication of a participant characteristic, according to certain embodiments.

FIG. 10 is a flow chart depicting an example of a process 1000 for limiting access to data based on a received indication of a participant characteristic. In some cases, the indication is received from a user. In some embodiments, such as described in regards to FIGS. 1-9, a computing device executing filtering system implements operations described in FIG. 10, by executing suitable program code. In additional or alternative embodiments, a computing device implementing a data source implements operations described in FIG. 10, by executing suitable program code. For illustrative purposes, the process 1000 is described with reference to the examples depicted in FIGS. 1-9. Other implementations, however, are possible.

At block 1010, process 1000 involves receiving a request to provide information. For example, the requested information could be related to a user system including individual user computing devices. The request could be received via a user interface, or via a participant system, as described elsewhere herein.

At block 1020, the process 1000 determines the information that is related to the user system. For example, the information could be determined based on a computing device that provided the request, as described elsewhere herein. In some embodiments, the related information is determined in part on a filter maintained by a filtering system, as described in regards to FIGS. 1-9.

At block 1030, the process 1000 involves receiving an indication to limit access to information generated by the user system. In some cases, the limitation is based on an indicated characteristic. For example, the limitation could be based on a characteristic associated with a participant or a participant system, as described elsewhere herein. Additionally or alternatively, the limitation could be based on an indicated user device included in the user system, such as a computing device identifier. In some embodiments, if the limitation does not indicate a user device, the limitation could be placed on all computing devices in the user system.

At block 1040, the process 1000 involves determining if the indicated characteristic corresponds to a filter. For example, the indicated characteristic could correspond to a participant characteristic that is included in the filter associated with that participant, as described elsewhere herein.

At block 1050, the process 1000 involves determining if the indicated user device corresponds to a filter key, a stored device identifier, or both. The filter key could be included in a filter maintained by a filtering system. The stored ID could be included in a data cluster in a data source.

In block 1060, the process 1000 involves modifying the filter based on the indicated characteristic. For example, if the indicated characteristic corresponds to a participant characteristic, as determined by operations related to block 1040, the associated filter could be modified. In some cases, modification of the filter could be further based on the indicated user device, such as if the user device corresponds to a filter key, as determined by operations related to block 1050. In some embodiments, the filter is modified to limit information provided to the participant associated with the filter, as described elsewhere herein.

In block 1070, the process 1000 involves modifying a data cluster based on the indicated characteristic. For example, if the user device corresponds to a stored device ID, as determined by operations related to block 1050, the data cluster associated with the stored ID could be modified. In some embodiments, the data cluster is modified to limit access to information based on the indicated characteristic, as described elsewhere herein.

In some embodiments, operations related to blocks 1060 and 1070 are performed. In additional or alternative embodiments, operations related to either of blocks 1060 and 1070 are omitted. In some cases, operations related to either of blocks 1060 and 1070 are performed or omitted responsive to previous operations. For example, if operations related to block 1040 determine that the indicated characteristic corresponds to a filter, the filter could be modified by operations related to block 1060.

In some cases, operations described in relation to FIG. 10 could be performed by a data source. Additionally or alternatively, these operations could be performed by a filtering system, or responsive to operations performed by a filtering system, or both.

Figure 11:
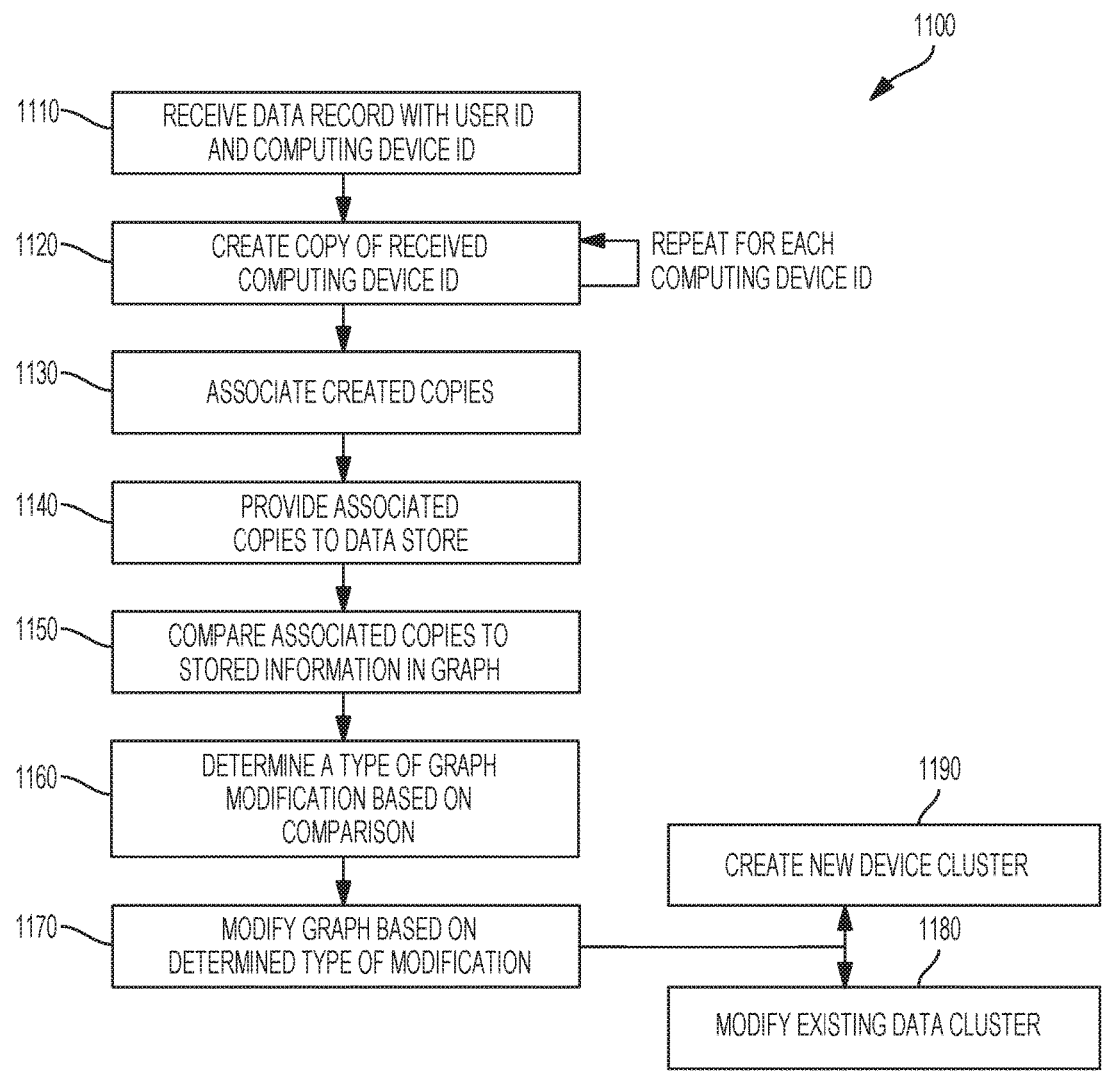
FIG. 11 is a flow chart depicting an example of a process for adding received information to a data source, according to certain embodiments.

FIG. 11 is a flow chart depicting an example of a process 1100 for adding received information to a data source. In some embodiments, such as described in regards to FIGS. 1-10, a computing device executing a filtering system implements operations described in FIG. 11, by executing suitable program code. In additional or alternative embodiments, a computing device implementing a data source implements operations described in FIG. 11, by executing suitable program code. For illustrative purposes, the process 1100 is described with reference to the examples depicted in FIGS. 1-10. Other implementations, however, are possible.

In block 1110, the process 1100 involves receiving a data record including a user identification and one or more computing device identifiers. The user ID and the computing device IDs could be associated with a user system, as described in regards to FIGS. 1-10. In some cases, the received record includes additional information, such as a characteristic of a computing device, as described elsewhere herein.

In some embodiments, operations related to block 1110 are implemented with operations regarding limiting access to data, as described in regards to FIG. 7 and elsewhere herein.

In block 1120, the process 1100 involves creating a copy of the computing device ID included in the received record. Additional information, such as a device characteristic, could be included in the copied information. Additionally or alternatively, the user ID could be omitted from the copied information. In some embodiments, operations related to block 1120 are repeated for each computing device identifier included in the received user data.

In block 1130, the process 1100 involves associating the created copies of the computing device IDs. In some embodiments, the copies are associated by an indication that they are received in a same data record, or an indication that they are associated with a same user system, or both. Any suitable association may be used. In some cases, the indicated association omits identifying information, such as the user ID.

In block 1140, process 1100 involves providing the associated copies to a data store. The data store could include a device graph, or data clusters, or both. In some cases, additional information, such as a device characteristic, is provided with the associated copies, as described elsewhere herein. In some cases, the associated copies could be provided with an indicated association that omits identifying information, such as the user ID. In certain embodiments, operations related to block 1140 are omitted.

In block 1150, process 1100 involves comparing the copies to stored information. For example, the copies could be compared to device IDs that are stored in a device graph. In some embodiments, the comparison of the copies and stored information is based in part upon additional information provided with the copies.

In block 1160, process 1100 involves determining a modification to the device graph, wherein the modification is based on the comparison described in regards to block 1150. Additionally or alternatively, the determined modification is based on the additional information provided with the associated copies. For example, a modification could be determined based on a relation between a stored device ID and a copied device ID, or between a stored characteristic and a provided characteristic, or both.

In block 1170, process 1100 involves modifying the device graph based on the determined modification. In some embodiments, modifying the device graph includes modifying a device cluster, as indicated by block 1180, or creating a new device cluster, as indicated by block 1190, or both. In some cases, modifying the device graph is based on the additional information provided with the copies.

In some cases, operations described in relation to FIG. 11 could be performed by a data source, by a filtering system, or both. Additionally or alternatively, these described operations could be performed responsive to operations performed by a filtering system.

Figure 12:
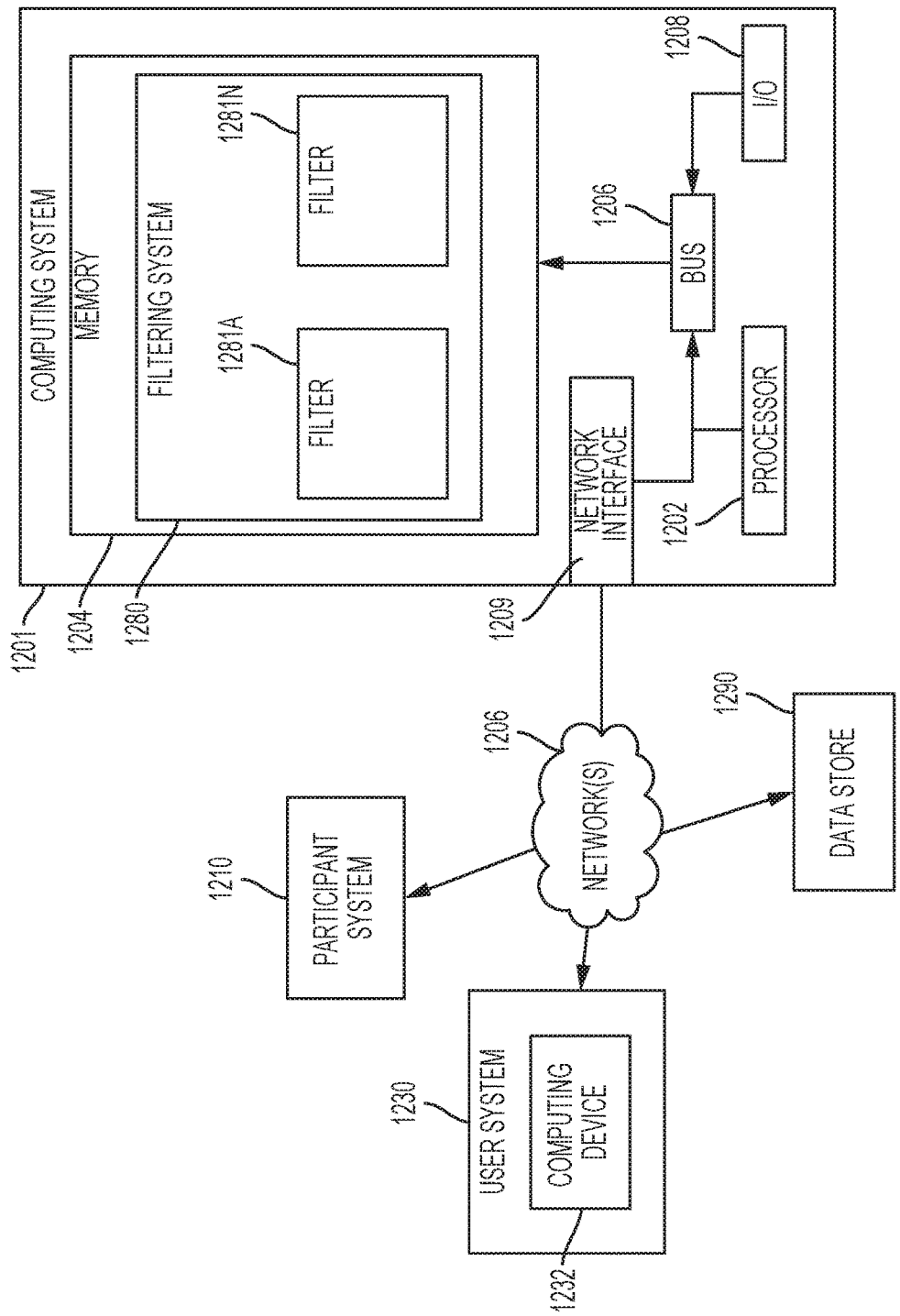
FIG. 12 is a diagram depicting an example of an implementation of a computing system including a filtering system, according to certain embodiments.

Any suitable computing system or group of computing systems can be used for performing the operations described herein. For example, FIG. 12 is a block diagram depicting an example implementation of a filtering system, according to certain embodiments.

The depicted example of a computing system 1201 includes one or more processors 1202 communicatively coupled to one or more memory devices 1204. The processor 1202 executes computer-executable program code or accesses information stored in the memory device 1204. Examples of processor 1202 include a microprocessor, an application-specific integrated circuit ("ASIC"), a field-programmable gate array ("FPGA"), or other suitable processing device. The processor 1202 can include any number of processing devices, including one.

The memory device 1204 includes any suitable non-transitory computer-readable medium for storing the filtering system 1280, the filters 1281A-1281N, and other received or determined indications or data records. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1201 may also include a number of external or internal devices such as input or output devices. For example, the computing system 1201 is shown with an input/output ("I/O") interface 1208 that can receive input from input devices or provide output to output devices. A bus 1206 can also be included in the computing system 1201. The bus 1206 can communicatively couple one or more components of the computing system 1201.

The computing system 1201 executes program code that configures the processor 1202 to perform one or more of the operations described above with respect to FIGS. 1-11. The program code includes operations related to, for example, one or more of the filtering system 1280, the data store 1290, the participant system 1210, the user system 1230, or other suitable applications or memory structures that perform one or more operations described herein. The program code may be resident in the memory device 1204 or any suitable computer-readable medium and may be executed by the processor 1202 or any other suitable processor. In some embodiments, the program code described above and the filtering system 1280 are stored in the memory device 1204, as depicted in FIG. 12. In additional or alternative embodiments (not depicted in FIG. 12), the memory device 1204 stores data from the data cooperative, such as in a data store, a graph, or one or more data clusters as described elsewhere herein. In additional or alternative embodiments, one or more of the filtering system 1280, the data store 1290, and the program code described above are stored in one or more memory devices accessible via a data network, such as a memory device accessible via a cloud service.

The computing system 1201 depicted in FIG. 12 also includes at least one network interface 1209. The network interface 1209 includes any device or group of devices suitable for establishing a wired or wireless data connection to one or more data networks 1206. Non-limiting examples of the network interface 1209 include an Ethernet network adapter, a modem, and/or the like. The computing system 1201 is able to communicate with one or more of the participant system 1210, including a user interface of the participant system, the user system 1230 including user computing device 1232, and the data store 1290 using the network interface 1209.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of limiting access to data included in a data cooperative, the method comprising:
   receiving, from a participant system, a record of user data, the record having a user identification and a computing device identifier that is associated with the user identification;
   creating a filter key indicating the computing device identifier;
   assigning the filter key to a filter associated with the participant system;
   applying the filter to a data source including multiple data clusters, wherein each data cluster includes multiple stored device identifiers;
   determining, based on the applied filter, that the filter key (i) corresponds to a first stored device identifier included in a matching data cluster of the multiple data clusters, and (ii) does not correspond to an additional stored device identifier from the multiple stored device identifiers, wherein the additional stored device identifier is included in a non-matching data cluster of the multiple data clusters;

determining that a second stored device identifier included in the matching data cluster is linked to the first stored device identifier;

providing, to the participant system, the second stored device identifier and an indication that the second stored device identifier is linked to the first stored device identifier; and withholding, from the participant system, the additional stored device identifier, responsive to determining that the additional stored device identifier is not linked to the first stored device identifier.

2. The method of claim 1, wherein:

the record received from the participant system indicates a characteristic associated with the computing device identifier;

the filter key created for the computing device identifier indicates the associated characteristic; and determining that the second stored device identifier is linked to the first stored device identifier is further based on determining that the second stored device identifier has a stored characteristic that corresponds to the associated characteristic indicated by the filter key.

3. The method of claim 1, wherein:

the filter indicates a participant characteristic associated with the participant system; and determining that the second stored device identifier is linked to the first stored device identifier is further based on determining that the second stored device identifier has a stored characteristic that corresponds to the participant characteristic indicated by the filter.

4. The method of claim 1, further comprising:

receiving, from a user interface, an indication of a given computing device identifier;

determining that the indicated computing device identifier corresponds to the filter key assigned to the filter; and modifying the filter to withhold, from the participant system, data that corresponds to the indicated computing device identifier.

5. The method of claim 1, further comprising:

receiving, from a user interface, an indication of a given computing device identifier;

receiving, from the user interface, an indication of a participant characteristic;

determining that the indicated computing device identifier corresponds to the filter key assigned to the filter;

determining that the indicated participant characteristic corresponds to a characteristic associated with the participant system; and modifying the filter to withhold, from the participant system, data that corresponds to the indicated computing device identifier.

6. The method of claim 1, further comprising:

wherein the received record of user data has multiple additional computing device identifiers, providing, to the data source, the multiple additional computing device identifiers, wherein multiple additional stored device identifiers are added to the matching data cluster based on the multiple additional computing device identifiers.

7. The method of claim 1, wherein the user identification included in the record received from the participant system is encrypted.

8. A non-transitory computer-readable medium embodying program code for limiting access to data included in a data cooperative, the program code comprising instructions which, when executed by a processor, cause the processor to perform operations comprising:

receiving, from a participant system, a record of user data, the record having a user identification and a computing device identifier that is associated with the user identification;

creating a filter key indicating the computing device identifier;

assigning the filter key to a filter associated with the participant system;

applying the filter to a data source including multiple data clusters, wherein each data cluster includes multiple stored device identifiers;

determining, based on the applied filter, that the filter key (i) corresponds to a first stored device identifier included in a matching data cluster of the multiple data clusters, and (ii) does not correspond to an additional stored device identifier from the multiple stored device identifiers, wherein the additional stored device identifier is included in a non-matching data cluster of the multiple data clusters;

determining that a second stored device identifier included in the matching data cluster is linked to the first stored device identifier;

providing, to the participant system, the second stored device identifier and an indication that the second stored device identifier is linked to the first stored device identifier; and withholding, from the participant system, the additional stored device identifier, responsive to determining that the additional stored device identifier is not linked to the first stored device identifier.

9. The non-transitory computer-readable medium of claim 8, wherein:

the record received from the participant system indicates a characteristic associated with the computing device identifier;

the filter key created for the computing device identifier indicates the associated characteristic; and determining that the second stored device identifier is linked to the first stored device identifier is further based on determining that the second stored device identifier has a stored characteristic that corresponds to the associated characteristic indicated by the filter key.

10. The non-transitory computer-readable medium of claim 8, wherein:

the filter indicates a participant characteristic associated with the participant system; and determining that the second stored device identifier is linked to the first stored device identifier is further based on determining that the second stored device identifier has a stored characteristic that corresponds to the participant characteristic indicated by the filter.

11. The non-transitory computer-readable medium of claim 8, the program code comprising further instructions for:

receiving, from a user interface, an indication of a given computing device identifier;

determining that the indicated computing device identifier corresponds to the filter key assigned to the filter; and modifying the filter to withhold, from the participant system, data that corresponds to the indicated computing device identifier.

12. The non-transitory computer-readable medium of claim 8, the program code comprising further instructions for:

receiving, from a user interface, an indication of a given computing device identifier;

receiving, from the user interface, an indication of a participant characteristic;

determining that the indicated computing device identifier corresponds to the filter key assigned to the filter;

determining that the indicated participant characteristic corresponds to a characteristic associated with the participant system; and modifying the filter to withhold, from the participant system, data that corresponds to the indicated computing device identifier.

13. The non-transitory computer-readable medium of claim 8, the program code comprising further instructions for:

wherein the received record of user data has multiple additional computing device identifiers, providing, to the data source, the multiple additional computing device identifiers, wherein multiple additional stored device identifiers are added to the matching data cluster based on the multiple additional computing device identifiers.

14. A system for limiting access to data included in a data cooperative, the system comprising:

a means for receiving, from a participant system, a record of user data, the record having a user identification and a computing device identifier that is associated with the user identification;

a means for creating a filter key indicating the computing device identifier; a means for assigning the filter key to a filter associated with the participant system;

a means for applying the filter to a data source including multiple data clusters, wherein each data cluster includes multiple stored device identifiers;

a means for determining, based on the applied filter, that the filter key (i) corresponds to a first stored device identifier included in a matching data cluster of the multiple data clusters, and (ii) does not correspond to an additional stored device identifier from the multiple stored device identifiers, wherein the additional stored device identifier is included in a non-matching data cluster of the multiple data clusters;

a means for determining that a second stored device identifier included in the matching data cluster is linked to the first stored device identifier;

a means for providing, to the participant system, the second stored device identifier and an indication that the second stored device identifier is linked to the first stored device identifier; and a means for withholding, from the participant system, the additional stored device identifier, responsive to determining that the additional stored device identifier is not linked to the first stored device identifier.

15. The system of claim 14, wherein:

the record received from the participant system indicates a characteristic associated with the computing device identifier;

the filter key created for the computing device identifier indicates the associated characteristic; and the means for determining that the second stored device identifier is linked to the first stored device identifier is further based on determining that the second stored device identifier has a stored characteristic that corresponds to the associated characteristic indicated by the filter key.

16. The system of claim 14, wherein:

the filter indicates a participant characteristic associated with the participant system; and the means for determining that the second stored device identifier is linked to the first stored device identifier is further based on determining that the second stored device identifier has a stored characteristic that corresponds to the participant characteristic indicated by the filter.

17. The system of claim 14, further comprising:

a means for receiving, from a user interface associated with the system, an indication of a given computing device identifier;

a means for determining that the indicated computing device identifier corresponds to the filter key assigned to the filter; and a means for modifying the filter to withhold, from the participant system, data that corresponds to the indicated computing device identifier.

18. The system of claim 14, further comprising:

a means for receiving, from a user interface associated with the system, an indication of a given computing device identifier;

a means for receiving, from the user interface, an indication of a participant characteristic;

a means for determining that the indicated computing device identifier corresponds to the filter key assigned to the filter;

a means for determining that the indicated participant characteristic corresponds to a characteristic associated with the participant system; and a means for modifying the filter to withhold, from the participant system, data that corresponds to the indicated computing device identifier.

19. The system of claim 14, further comprising:

wherein the received record of user data has multiple additional computing device identifiers, providing, to the data source, the multiple additional computing device identifiers, wherein multiple additional stored device identifiers are added to the matching data cluster based on the multiple additional computing device identifiers.

20. The system of claim 14, wherein the user identification included in the record received from the participant system is encrypted.

* * * * *